US012649345B2

(12) United States Patent (10) Patent No.: US 12,649,345 B2

Ogawa et al. (45) Date of Patent: Jun. 9, 2026

(54) VEHICLE CONTROL DEVICE AND VEHICLE CONTROL SYSTEM

(71) Applicant: Hitachi Astemo, Ltd., Hitachinaka (JP)

(72) Inventors: Takayuki Ogawa, Hitachinaka (JP); Ryusuke Hirao, Hitachinaka (JP); Hiroki Ishimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 125 days.

(21) Appl. No.: 18/692,003

(22) PCT Filed: Sep. 16, 2022

(86) PCT No.: PCT/JP2022/034767
§ 371 (c)(1),
(2) Date: Mar. 14, 2024

(87) PCT Pub. No.: WO2023/048085
PCT Pub. Date: Mar. 30, 2023

(65) Prior Publication Data
US 2025/0128562 A1 Apr. 24, 2025

(30) Foreign Application Priority Data
Sep. 27, 2021 (JP) ................................. 2021-156440

(51) Int. Cl.
*B60G 17/018* (2006.01)
*B60G 17/016* (2006.01)
*B60G 17/019* (2006.01)

(52) U.S. Cl.
CPC ..... *B60G 17/0182* (2013.01); *B60G 17/0162* (2013.01); *B60G 17/01933* (2013.01);
(Continued)

(58) Field of Classification Search
CPC .............. B60G 17/0162; B60G 17/018; B60G 17/0182; B60G 17/01933;
(Continued)

(56) References Cited

U.S. PATENT DOCUMENTS 6,175,792 B1 * 1/2001 Jones ................. B60G 21/0553
701/37
9,242,670 B2 * 1/2016 Endo .................... B62D 5/0466
(Continued)

FOREIGN PATENT DOCUMENTS

JP 7-167651 7/1995
JP 9-203637 8/1997
(Continued)

OTHER PUBLICATIONS

International Search Report issued Dec. 6, 2022 in International Application No. PCT/JP2022/034767, with English Translation.
(Continued)

*Primary Examiner* — Carl C Staubach
(74) *Attorney, Agent, or Firm* — Wenderoth, Lind & Ponack, L.L.P.

(57) ABSTRACT

A longitudinal acceleration calculation unit includes a low-pass filter (LPF), a high-pass filter (HPF), and an addition unit. The LPF is configured to acquire a first longitudinal acceleration of a vehicle detected by a longitudinal acceleration sensor, and remove a high-frequency component of the first longitudinal acceleration. The HPF is configured to acquire a second longitudinal acceleration of the vehicle
(Continued)

estimated based on an engine torque of the vehicle and a brake hydraulic pressure of the vehicle, and remove a low-frequency component of the second longitudinal acceleration. The addition unit is configured to obtain a composed longitudinal acceleration of the vehicle based on a post-high-frequency-component-removal longitudinal acceleration obtained by removing the high-frequency component by the LPF and a post-low-frequency-component-removal longitudinal acceleration obtained by removing the low-frequency component by the HPF.

6 Claims, 10 Drawing Sheets

(52) U.S. Cl.
CPC ................ *B60G 2400/0523* (2013.01); *B60G 2400/104* (2013.01); *B60G 2400/204* (2013.01); *B60G 2600/122* (2013.01); *B60G 2600/602* (2013.01); *B60G 2600/604* (2013.01)

(58) Field of Classification Search
CPC ...... B60G 2400/0523; B60G 2400/102; B60G 2400/104; B60G 2400/106; B60G 2400/202; B60G 2400/204; B60G 2400/208; B60G 2400/252; B60G 2400/41; B60G 2400/50; B60G 2400/80; B60G 2400/90; B60G 2500/10; B60G 2600/02; B60G 2600/122; B60G 2600/182; B60G 2600/184; B60G 2600/602; B60G 2600/604; B60G 2800/01; B60W 40/109
See application file for complete search history.

(56)  References Cited

U.S. PATENT DOCUMENTS

| | | | | |
|---|---|---|---|---|
| 2004/0133330 | A1* | 7/2004 | Ono | B60T 8/172 |
| | | | | 701/80 |
| 2006/0074541 | A1* | 4/2006 | Ono | B60T 8/172 |
| | | | | 701/80 |
| 2013/0338869 | A1 | 12/2013 | Tsumano | |
| 2015/0239442 | A1* | 8/2015 | Yamakado | B60T 8/17555 |
| | | | | 701/70 |
| 2019/0039429 | A1 | 2/2019 | Fujii et al. | |
| 2025/0135830 | A1* | 5/2025 | Kawasaki | B60G 17/018 |

FOREIGN PATENT DOCUMENTS

| | | |
|---|---|---|
| JP | 11-263113 | 9/1999 |
| JP | 2004-74845 | 3/2004 |
| JP | 2004-352046 | 12/2004 |
| JP | 2010-202144 | 9/2010 |
| JP | 2012-171376 | 9/2012 |
| JP | 2018-188101 | 11/2018 |
| JP | 2019-142491 | 8/2019 |

OTHER PUBLICATIONS

Written Opinion of the International Searching Authority issued Dec. 6, 2022 in International Application No. PCT/JP2022/034767, with English Translation.
Office Action issued May 1, 2025 in corresponding Korean Patent Application No. 10-2024-7003155, with English translation.
Office Action issued Dec. 3, 2024 in corresponding Japanese Patent Application No. 2023-549525, with machine translation.

* cited by examiner

Fig. 3

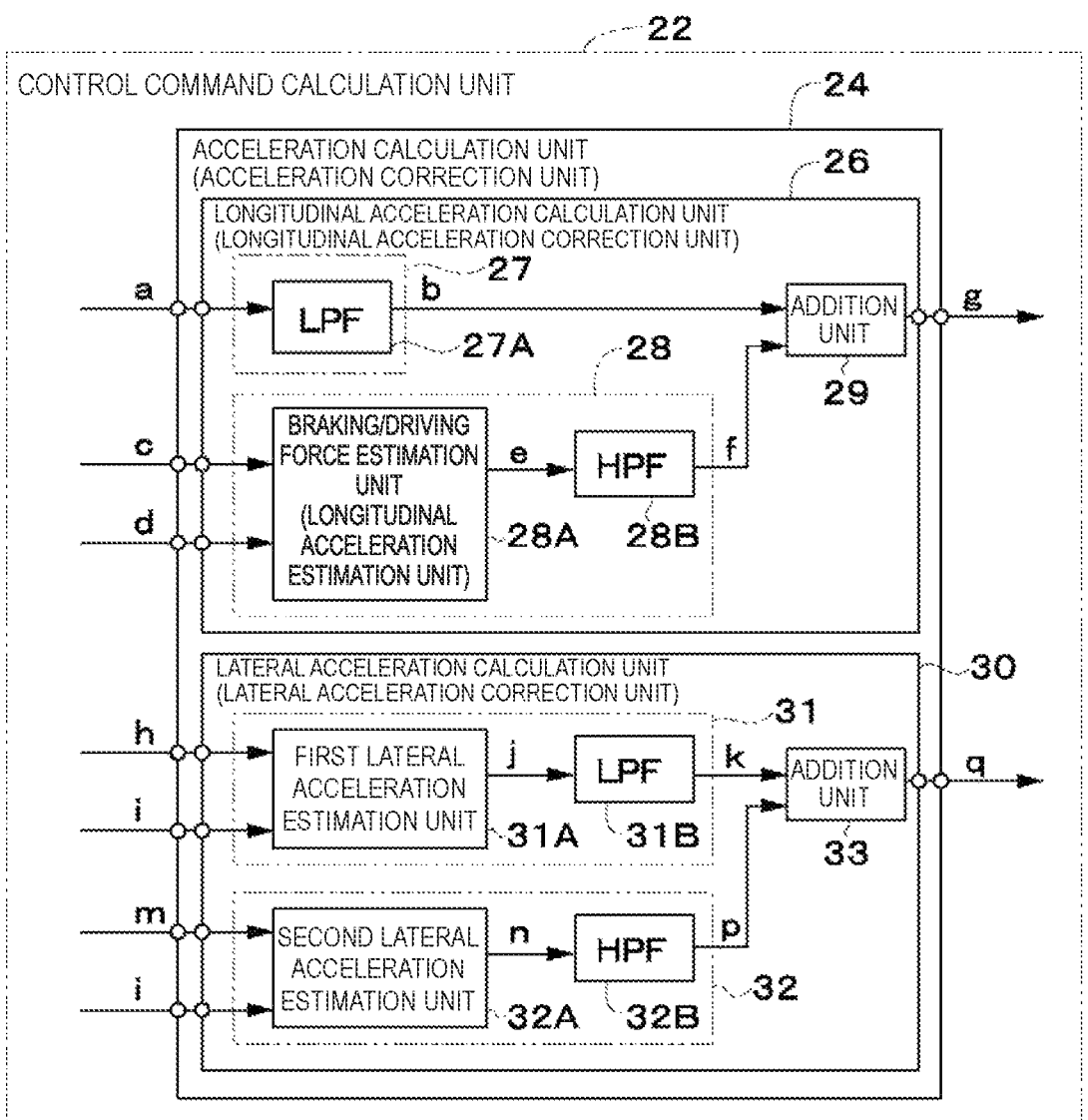

a: LONGITUDINAL ACCELERATION SENSOR
   DETECTION VALUE b: LONGITUDINAL ACCELERATION SENSOR
   DETECTION VALUE (AFTER LPF)

c: ENGINE TORQUE d: BRAKE HYDRAULIC PRESSURE e: LONGITUDINAL ACCELERATION ESTIMATION
   VALUE f: LONGITUDINAL ACCELERATION ESTIMATION
   VALUE (AFTER HPF)

g: LONGITUDINAL ACCELERATION (COMPOSED
   LONGITUDINAL ACCELERATION)

h: YAW RATE SENSOR DETECTION VALUE i: VEHICLE SPEED j: FIRST LATERAL ACCELERATION ESTIMATION VALUE k: FIRST LATERAL ACCELERATION ESTIMATION VALUE
   (AFTER LPF)

m: STEERING ANGLE n: SECOND LATERAL ACCELERATION ESTIMATION VALUE p: SECOND LATERAL ACCELERATION ESTIMATION VALUE
   (AFTER HPF)

q: LATERAL ACCELERATION (COMPOSED LATERAL
   ACCELERATION)

Fig. 4
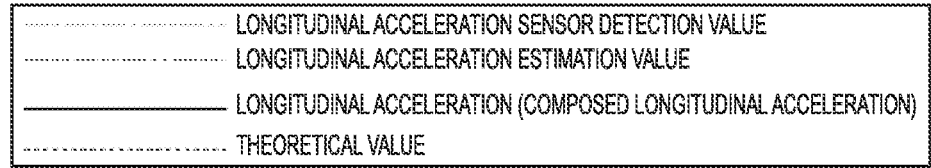
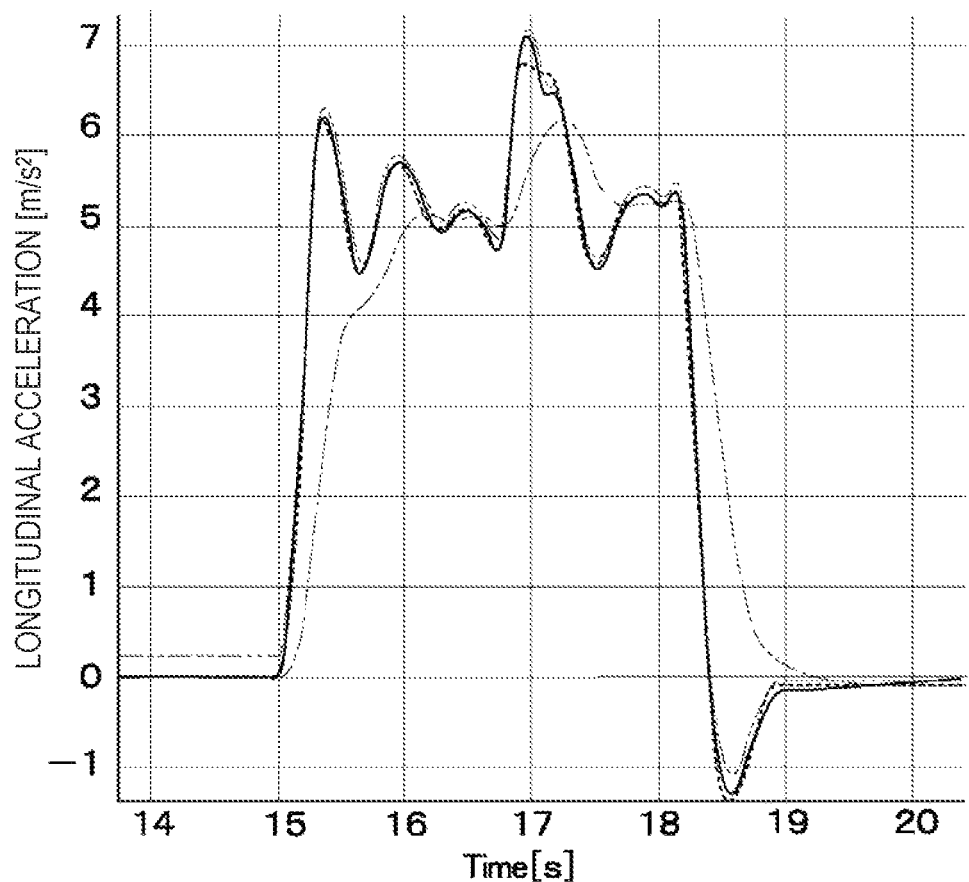

Fig. 5
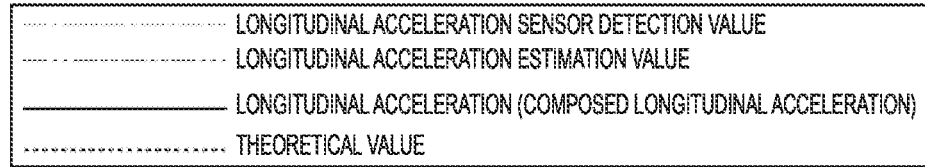
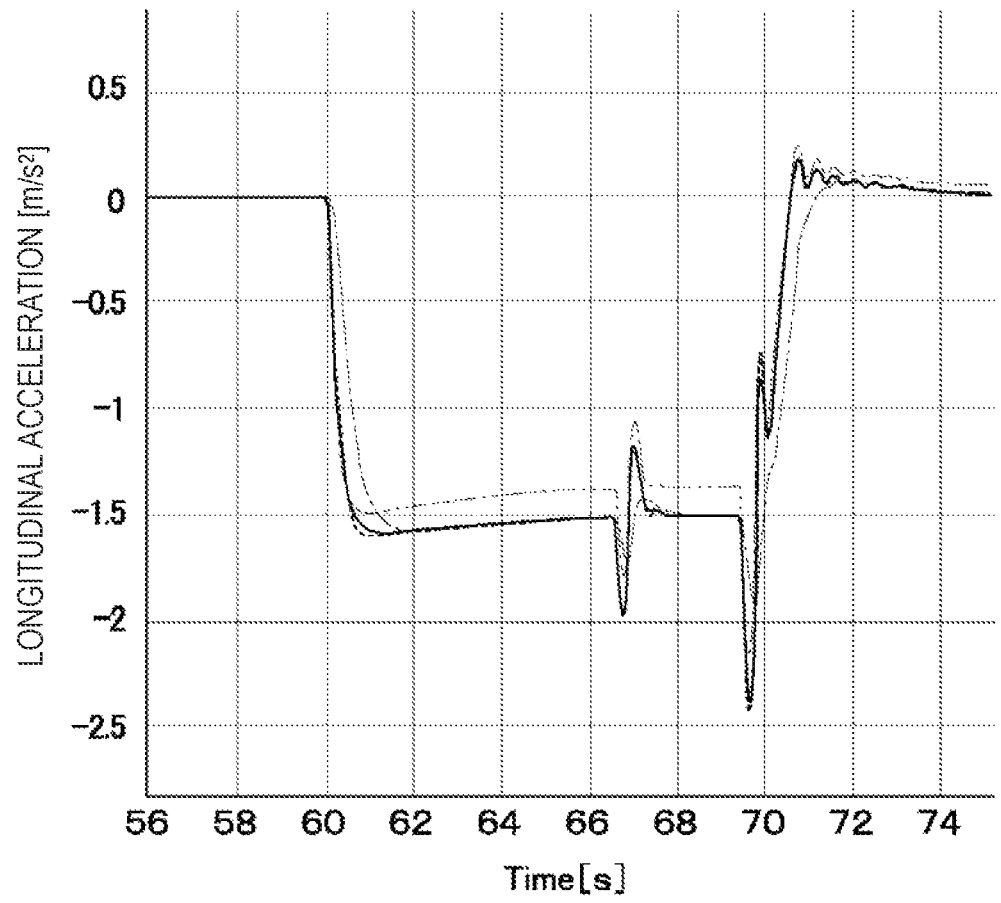

Fig. 6
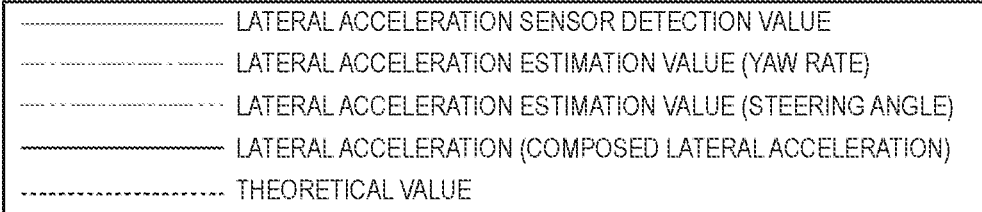
———————— LATERAL ACCELERATION SENSOR DETECTION VALUE
———·——·——— LATERAL ACCELERATION ESTIMATION VALUE (YAW RATE)
———··——··——·· LATERAL ACCELERATION ESTIMATION VALUE (STEERING ANGLE)
———————— LATERAL ACCELERATION (COMPOSED LATERAL ACCELERATION)
·············· THEORETICAL VALUE
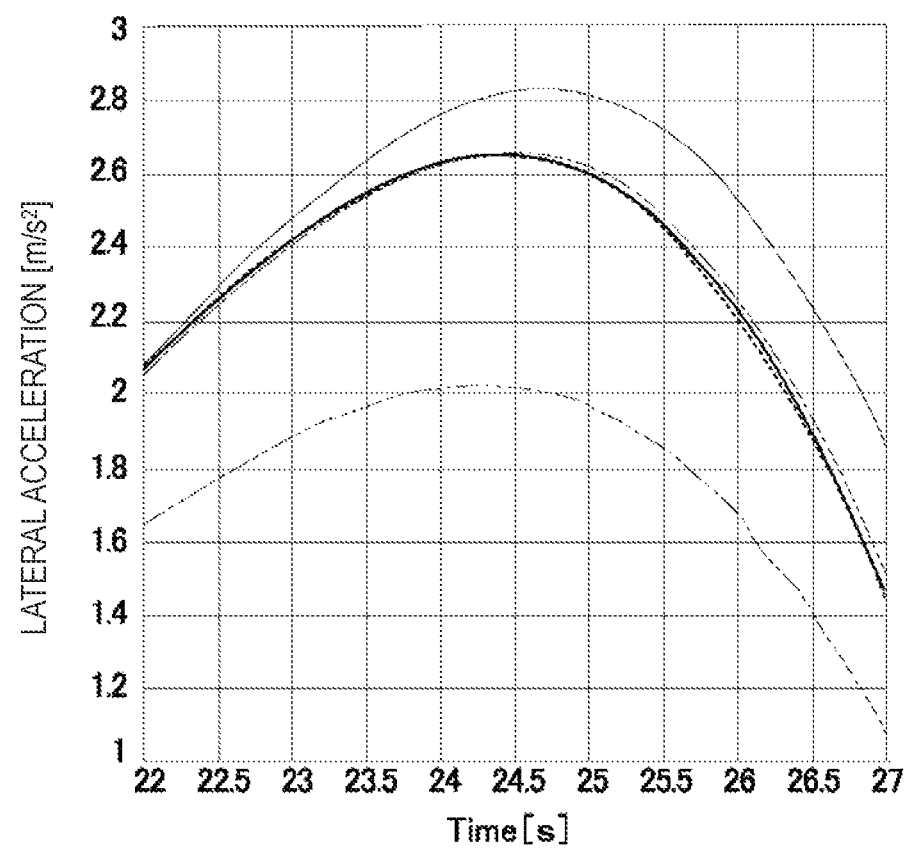

Fig. 7
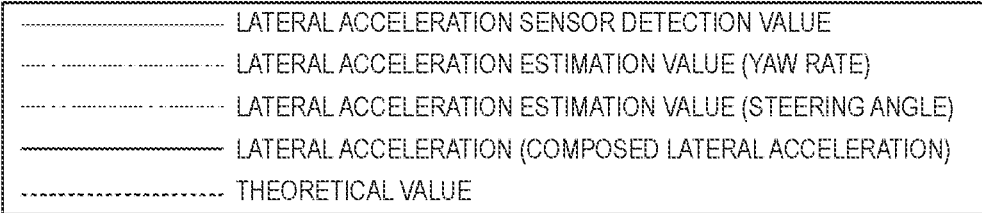
| | |
|---|---|
| ------------- | LATERAL ACCELERATION SENSOR DETECTION VALUE |
| ------------- | LATERAL ACCELERATION ESTIMATION VALUE (YAW RATE) |
| ------------- | LATERAL ACCELERATION ESTIMATION VALUE (STEERING ANGLE) |
| ------------- | LATERAL ACCELERATION (COMPOSED LATERAL ACCELERATION) |
| ------------- | THEORETICAL VALUE |
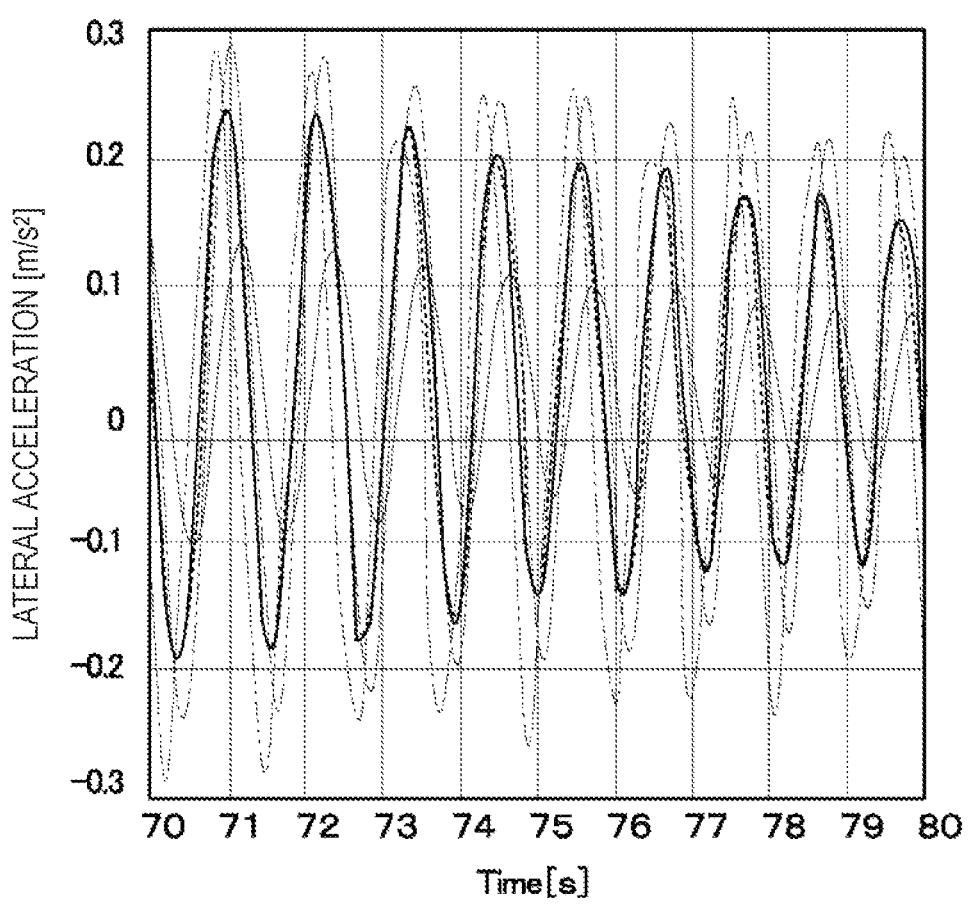

Fig. 8
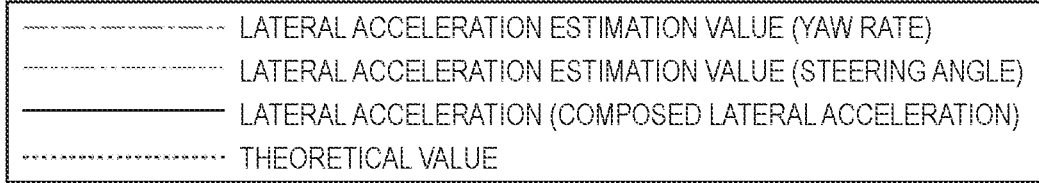
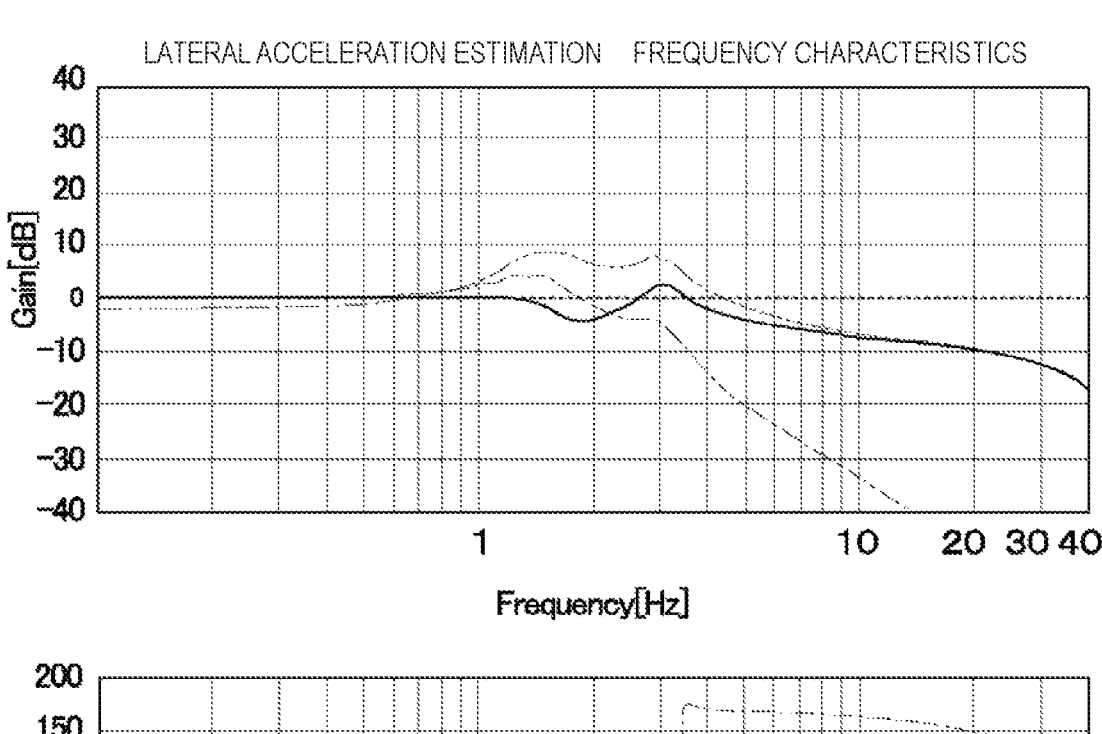
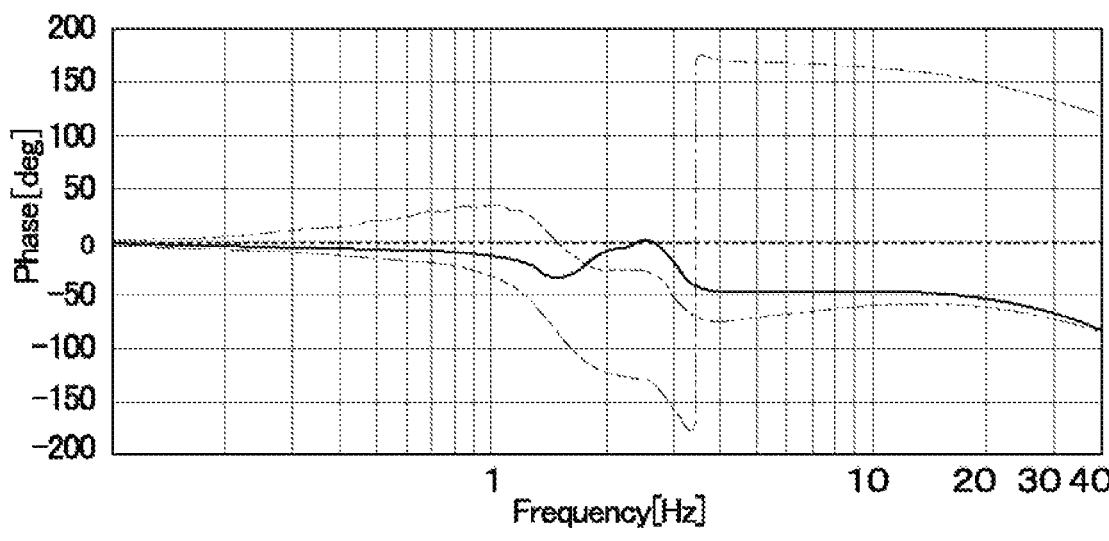

Fig. 9

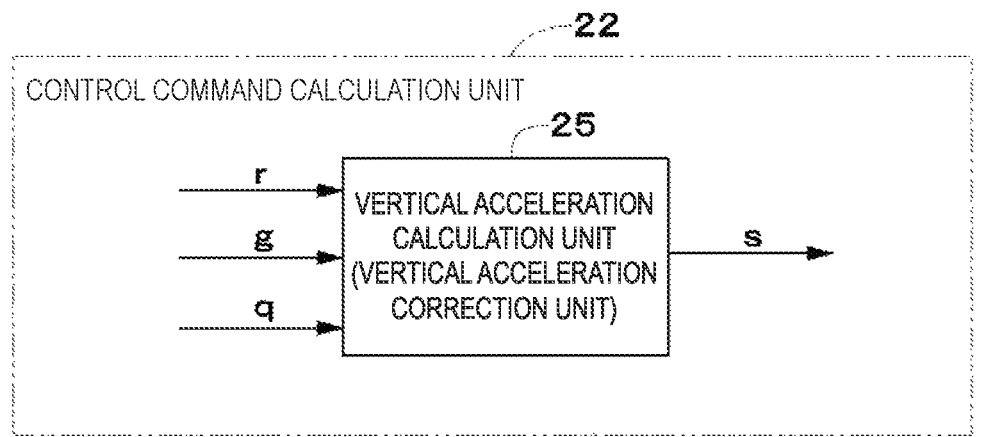

r: VERTICAL ACCELERATION (BEFORE
   CORRECTION)

s: VERTICAL ACCELERATION
   (AFTER CORRECTION)

g: LONGITUDINAL ACCELERATION (COMPOSED
   LONGITUDINAL ACCELERATION)

q: LATERAL ACCELERATION (COMPOSED
   LATERAL ACCELERATION)

Fig. 10

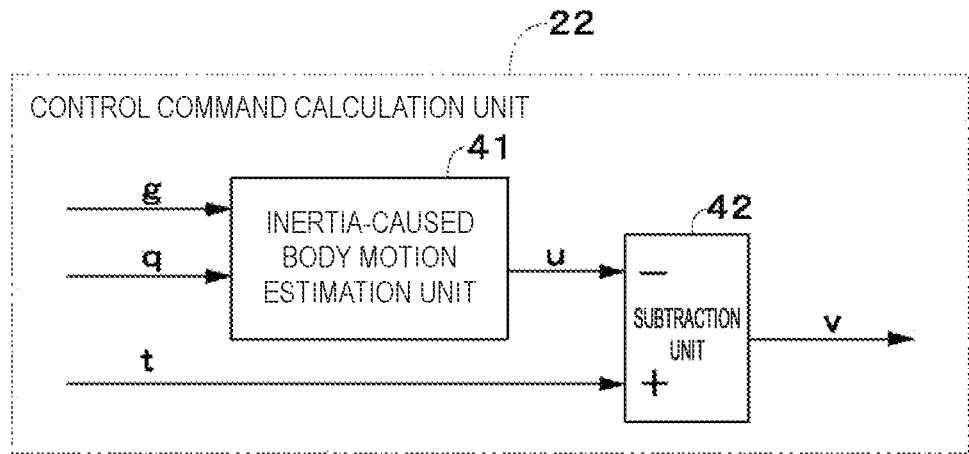

g: LONGITUDINAL ACCELERATION
   (COMPOSED LONGITUDINAL
   ACCELERATION)

u: RELATIVE DISPLACEMENT CAUSED
   BY ACCELERATION/DECELERATION v: RELATIVE DISPLACEMENT CAUSED
   BY ROAD SURFACE q: LATERAL ACCELERATION (COMPOSED
   LATERAL ACCELERATION)

t: RELATIVE DISPLACEMENT

Fig. 11

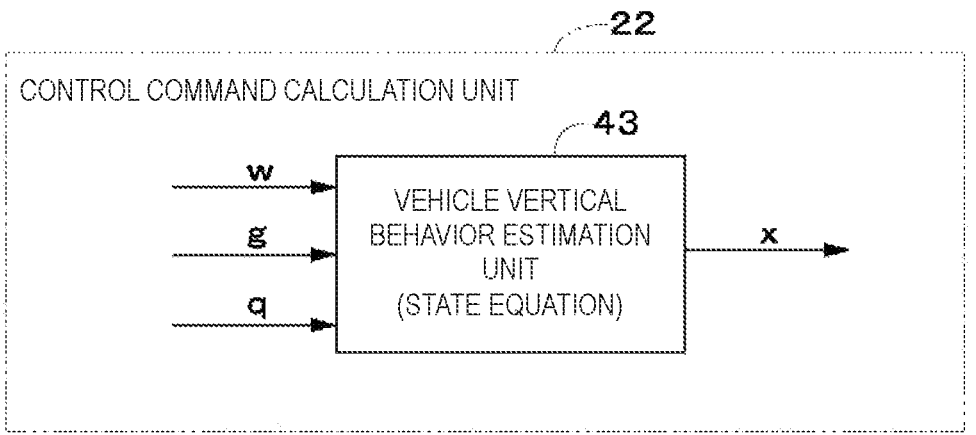

w: WHEEL SPEED AND THE LIKE g: LONGITUDINAL ACCELERATION
   (COMPOSED LONGITUDINAL ACCELERATION)

q: LATERAL ACCELERATION (COMPOSED
   LATERAL ACCELERATION)

x: VEHICLE VERTICAL BEHAVIOR
   (SPRUNG SPEED AND THE LIKE)

Fig. 12

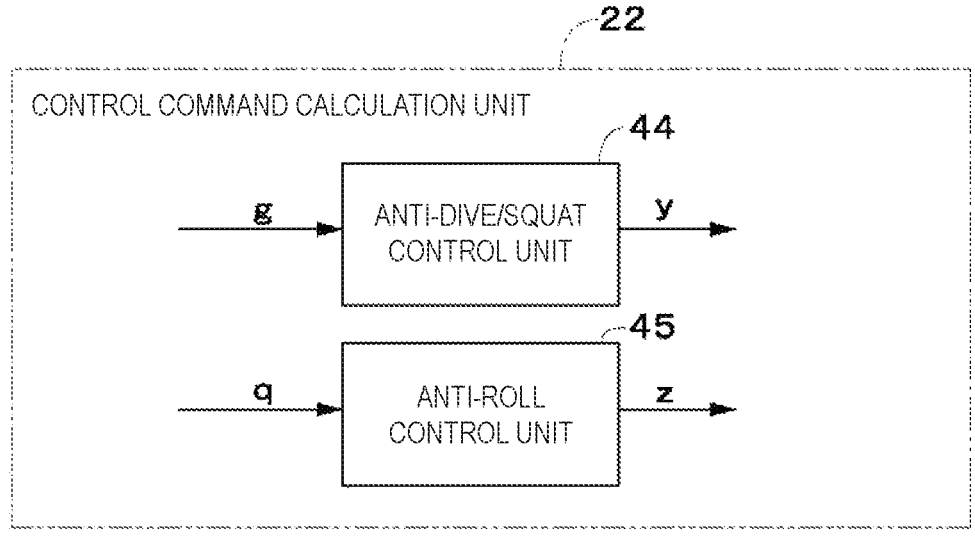

g: LONGITUDINAL ACCELERATION
   (COMPOSED LONGITUDINAL ACCELERATION)

q: LATERAL ACCELERATION (COMPOSED
   LATERAL ACCELERATION)

y: CONTROL COMMAND z: CONTROL COMMAND

VEHICLE CONTROL DEVICE AND VEHICLE CONTROL SYSTEM

CROSS-REFERENCE TO RELATED APPLICATION

The present application claims priority based on Japanese Patent Application No. 2021-156440 filed on Sep. 27, 2021. All disclosed contents including the Specification, Scope of Claims, Drawings, and Abstract of Japanese Patent Application No. 2021-156440 are incorporated herein by reference in their entirety.

TECHNICAL FIELD

The present disclosure relates to a vehicle control device and a vehicle control system which are installed on, for example, a vehicle such as an automobile.

BACKGROUND ART

For example, in JP 11-263113 A, there is described an apparatus and a method for improving the dynamic response of an active roll control apparatus which acquires both of a sensor detection value detected by a sensor and an estimation value, and obtains a command value from the two values through use of fuzzy logic control.

SUMMARY OF INVENTION

Technical Problem

The vehicle behavior detection by the sensor has a high accuracy in a low-frequency region, but is liable to be influenced by a road surface in a high-frequency region. For example, in a case in which a lateral acceleration is detected by a lateral acceleration sensor, when a vehicle body is tilted by a road surface input or the like, the lateral acceleration sensor also detects a vertical direction component. When a high-frequency component greatly influenced by the vertical direction component is removed, an original high-frequency component is also removed. As a result, the accuracy may decrease.

Solution To Problem

An object of the present invention is to provide a vehicle control device and a vehicle control system which are capable of highly accurately obtaining a planar motion amount of a vehicle.

According to one embodiment of the present invention, there is provided a vehicle control device for controlling an actuator which is provided between a vehicle body and a wheel of a vehicle, and is configured to change a force for suppressing a relative displacement between the vehicle body and the wheel, the vehicle control device including: a first calculation unit configured to acquire a planar motion amount of the vehicle detected by a sensor provided to the vehicle or a planar motion amount of the vehicle estimated based on a detection value detected by the sensor, and to remove a high-frequency component of the acquired planar motion amount of the vehicle; a second calculation unit configured to acquire a planar motion amount of the vehicle estimated based on an operation amount of the vehicle, and to remove a low-frequency component of the acquired planar motion amount of the vehicle; and a third calculation unit configured to obtain a planar motion amount of the vehicle based on a post-high-frequency-component-removal planar motion amount obtained by removing the high-frequency component by the first calculation unit and a post-low-frequency-component-removal planar motion amount obtained by removing the low-frequency component by the second calculation unit.

Further, according to one embodiment of the present invention, there is provided a vehicle control system including: a force generation mechanism configured to adjust a force between a vehicle body and a wheel of a vehicle; and a controller including: a first calculation unit configured to acquire a planar motion amount of the vehicle detected by a sensor provided to the vehicle or a planar motion amount of the vehicle estimated based on a detection value detected by the sensor, and to remove a high-frequency component of the acquired planar motion amount of the vehicle; a second calculation unit configured to acquire a planar motion amount of the vehicle estimated based on an operation amount of the vehicle, and to remove a low-frequency component of the acquired planar motion amount of the vehicle; and a third calculation unit configured to obtain a planar motion amount of the vehicle based on a post-high-frequency-component-removal planar motion amount obtained by removing the high-frequency component by the first calculation unit and a post-low-frequency-component-removal planar motion amount obtained by removing the low-frequency component by the second calculation unit.

According to the one embodiment of the present invention, it is possible to highly accurately obtain the planar motion amount of the vehicle.

BRIEF DESCRIPTION OF DRAWINGS

FIG. 3 is a flow diagram for illustrating processing executed in the vehicle control device (controller) of FIG. 2.

FIG. 4 is a characteristic graph for showing an example of a temporal change in longitudinal acceleration.

FIG. 5 is a characteristic graph for showing another example of the temporal change in longitudinal acceleration.

FIG. 6 is a characteristic graph for showing an example of a temporal change in lateral acceleration.

FIG. 7 is a characteristic graph for showing another example of the temporal change in lateral acceleration.

FIG. 8 is a characteristic graph for showing frequency characteristics (gain and phase) of the lateral acceleration.

FIG. 9 is a block diagram for illustrating a control calculation unit in the embodiment.

FIG. 10 is a block diagram for illustrating a first modification example of the control command calculation unit.

FIG. 11 is a block diagram for illustrating a second modification example of the control command calculation unit.

FIG. 12 is a block diagram for illustrating a third modification example of the control command calculation unit.

DESCRIPTION OF EMBODIMENTS

Now, description is given of a vehicle control device and a vehicle control system according to an embodiment of the present disclosure with reference to the accompanying drawings while exemplifying a case in which the vehicle control device and the vehicle control system are installed in an automobile (more specifically, a four-wheeled automobile) as a vehicle.

Figure 1:
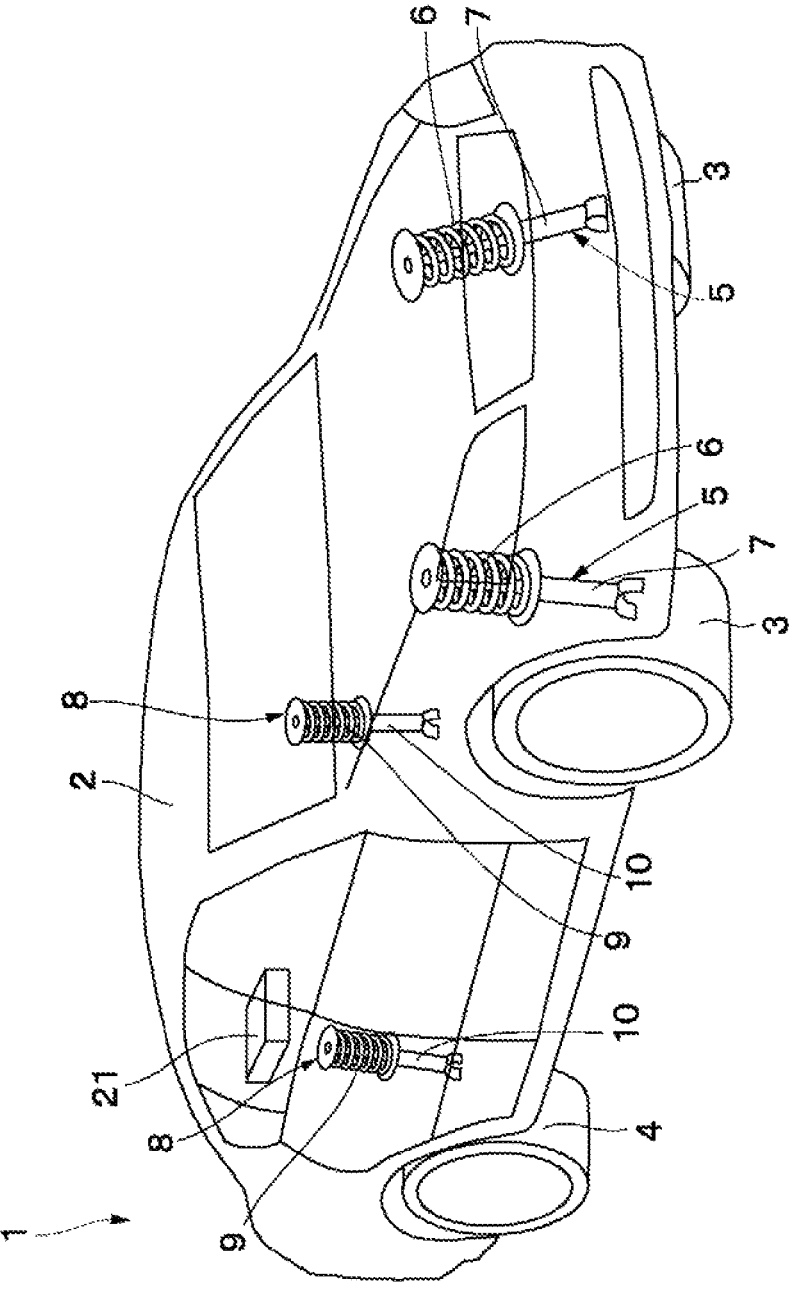
FIG. 1 is an overall configuration view for illustrating a four-wheeled automobile on which a vehicle control device and a vehicle control system according to an embodiment of the present disclosure are installed.

In FIG. 1, on a lower side of a vehicle body 2 forming a body of a vehicle 1 being the automobile, for example, four wheels 3 and 4 in total including left and right front wheels 3 and left and right rear wheels 4 (only one of each thereof is illustrated) are provided. Between each of the left and right front wheels 3 and the vehicle body 2, a suspension 5 on the front wheel side (hereinafter referred to as "front wheel suspension 5") is interposed. The front wheel suspension 5 includes a suspension spring 6 (hereinafter referred to as "spring 6") and a damping force adjustable shock absorber 7 (hereinafter referred to as "shock absorber 7") provided in parallel with the spring 6.

Between each of the left and right rear wheels 4 and the vehicle body 2, a suspension 8 on the rear wheel side (hereinafter referred to as "rear wheel suspension 8") is interposed. The rear wheel suspension 8 includes a suspension spring 9 (hereinafter referred to as "spring 9") and a damping force adjustable shock absorber 10 (hereinafter referred to as "shock absorber 10") provided in parallel with the spring 9. Each of the shock absorbers 7 and 10 is formed of, for example, a semi-active damper being a hydraulic cylinder device having an adjustable damping force (damping force variable shock absorber). That is, on the vehicle 1, a semi-active suspension system using the damping force variable shock absorbers is installed.

In this case, the shock absorbers 7 and 10 are force generation mechanisms (actuators) installed between the vehicle body 2 and the wheels 3 and 4 (more specifically, wheel-side members which support the wheels 3 and 4) of the vehicle 1. The shock absorbers 7 and 10 correspond to a vehicle posture control device which controls a posture of the vehicle 1. In the embodiment, each of the shock absorbers 7 and 10 is a damping force generation mechanism of a damping force variable type, that is, a damping force adjustable hydraulic shock absorber. Each of the shock absorbers 7 and 10 adjusts a force between the vehicle body 2 and each of the wheels 3 and 4 of the vehicle 1. In other words, each of the shock absorbers 7 and 10 changes a force for suppressing a relative displacement between the vehicle body 2 and each of the wheels 3 and 4. A characteristic of a generated damping force (damping force characteristic) of each of the shock absorbers 7 and 10 is variably controlled by a controller 21 described later.

Figure 2:
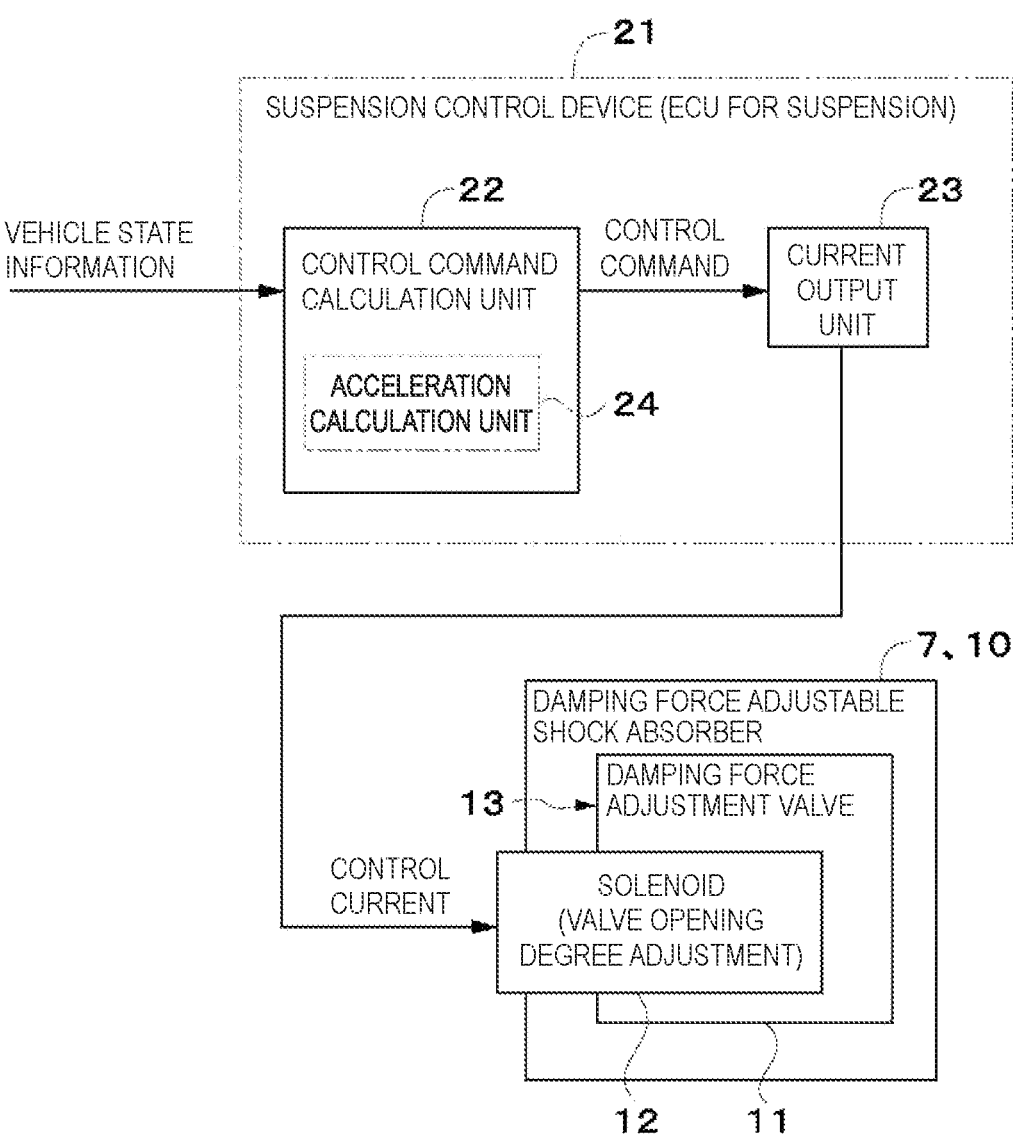
FIG. 2 is a block diagram for illustrating the vehicle control device and the vehicle control system of FIG. 1.

Thus, to each of the shock absorbers 7 and 10, a damping force adjustment device 13 formed of a damping force adjustment valve 11, a solenoid 12, and the like as illustrated in FIG. 2 described later are added in order to adjust the damping force characteristic continuously (or stepwise) from a hard characteristic to a soft characteristic. The damping force characteristic of each of the shock absorbers 7 and 10 is variably adjusted in accordance with a current (control current, command current, control signal, or command signal) supplied from the controller 21 to the damping force adjustment device 13 (solenoid 12).

As the damping force adjustment valve 11, a structure that has hitherto been known, such as a pressure control type of controlling a pilot pressure of a damping force generation valve and a flowrate control type of controlling a passage area, can be used. Moreover, each of the shock absorbers 7 and 10 is only required to be capable of adjusting the damping force continuously (or stepwise), and may be, for example, a pneumatic damper, an electromagnetic damper, an electrorheological fluid damper (ER damper), or a magnetic fluid damper. Moreover, each of the shock absorbers 7 and 10 may be an air suspension (vehicle height adjustment device) employing an air spring, hydraulic dampers (vehicle height adjustment device) formed by connecting front/rear and left/right hydraulic cylinders with each other through piping, a stabilizer which applies forces to motions of the left and right wheels, and the like.

Further, each of the shock absorbers 7 and 10 may be a full-active damper formed of a force generation mechanism capable of generating a thrust, that is, a hydraulic actuator, an electric actuator, or a pneumatic actuator. In other words, a full-active suspension system employing the full-active dampers may be installed on the vehicle 1. That is, each of the shock absorbers 7 and 10 is the force generation mechanism (actuator) capable of adjusting the force generated between the vehicle body 2 side and the side of each of the wheels 3 and 4 of the vehicle 1. As each of the shock absorbers 7 and 10, it is possible to employ various force generation mechanisms (actuators) such as a damping force variable hydraulic damper, an electrorheological fluid damper, a pneumatic damper, an electromagnetic damper, a hydraulic actuator, an electric actuator, and a pneumatic actuator.

To the vehicle 1, vehicle state detection means (not shown) which detects a state of the vehicle 1 is provided. The vehicle state detection means corresponds to, for example, at least one of various state detection sensors (detection devices) such as a longitudinal acceleration sensor, a lateral acceleration sensor, a wheel speed sensor, a steering angle sensor, a yaw rate sensor, a vehicle speed sensor, a vehicle height sensor, a sprung vertical acceleration sensor, a sprung vertical speed sensor, an unsprung vertical acceleration sensor, an unsprung vertical speed sensor, an engine torque sensor, and a brake hydraulic pressure sensor. The vehicle state detection means detects a vehicle state (for example, at least one of a longitudinal acceleration, a lateral acceleration, a wheel speed, a steering angle, a yaw rate, a vehicle speed, a vehicle height, a sprung vertical acceleration, a sprung vertical speed, an unsprung vertical acceleration, an unsprung vertical speed, an engine torque, and a brake hydraulic pressure). The vehicle state detection means outputs a signal corresponding to the detected vehicle state to the controller 21 as vehicle state information (FIG. 2).

Among the various state detection sensors, for example, the longitudinal acceleration sensor, the lateral acceleration sensor, and the yaw rate sensor correspond to sensors (planar motion amount sensors) which detect planar motion amounts of the vehicle 1. Moreover, among the various state detection sensors, for example, the steering angle sensor (steering operation amount detection sensor), the engine torque sensor (accelerator operation amount detection sensor), and the brake hydraulic pressure sensors (master cylinder pressure detection sensor, wheel cylinder pressure detection sensors, and brake operation amount detection sensor) correspond to sensors (vehicle operation amount sensors) which detect operation amounts relating to operations of the vehicle 1.

The controller 21 serving as the vehicle control device is connected to the vehicle state detection means, another controller (not shown), and the like via, for example, a communication line (information transmission line or vehicle data bus) such as a CAN being an in-vehicle LAN communication. The controller 21 includes, for example, a microcomputer, a power supply circuit, and a drive circuit, and is also referred to as "electronic control unit (ECU)." The controller 21 is a controller for the suspension system (suspension control device), that is, an ECU for the suspensions (ECU for shock absorbers).

An output side of the controller 21 is connected to the damping force adjustment device 13 (solenoid 12) of each of the shock absorbers 7 and 10. The controller 21 controls the shock absorbers 7 and 10 (adjusts the damping forces) based on various types of vehicle state information (vehicle state signals) including detection values from the vehicle state detection means (state detection sensors) and commands (control commands, operation commands, and command signals) relating to automatic control for the vehicle. Thus, a processing program which calculates the damping forces to be generated in the shock absorbers 7 and 10 based on the vehicle state information (vehicle state signals), a processing program which outputs the control signals (control currents) corresponding to the damping forces to be generated, and the like are stored in a memory (storage unit) of the controller 21.

As control laws (control law for ride comfort and control law for maneuverability and stability) which calculate the damping forces of the shock absorbers 7 and 10, for example, the skyhook control law, the BLQ control law (bilinear optimal control law), the H∞ control law, or the like can be used. Each of the shock absorbers 7 and 10 being the damping force variable damper changes the damping force to appropriately attenuate the vertical motion of each of the wheels 3 and 4, to thereby suppress vibration of the vehicle body 2.

Incidentally, the semi-active suspension system provided with the vertical acceleration sensor on the vehicle body detects a body motion caused by road surface input as a vehicle body vertical acceleration, and uses the vehicle body vertical acceleration to execute body motion control. However, when a vehicle body inclination such as a roll and a pitch occurs due to a vehicle operation such as a turn or an acceleration/deceleration, a detection axis of the acceleration sensor inclines, and hence accelerations in the longitudinal direction and the lateral direction overlap with the detection value of the vertical acceleration sensor. In order to appropriately remove those overlapping components, accurate calculation of the longitudinal acceleration and the lateral acceleration is indispensable.

Moreover, for example, in a semi-active suspension system which estimates the vertical motion of the vehicle body from the wheel speed, highly accurate calculation of the longitudinal acceleration and the lateral acceleration is required in order to separate the vertical motion component and the planar motion components from each other. Further, in a semi-active suspension system including only vehicle height sensors each of which detects a relative displacement between the vehicle body and the wheel, the longitudinal acceleration and the lateral acceleration are required in order to estimate a body motion caused by inertia in processing of extracting only the body motion (relative displacement) caused by the road surface variation from the detected relative displacements. Thus, in vehicle behavior control including the suspension system, the longitudinal acceleration and the lateral acceleration are used in various ways, and hence it is required to increase an estimation accuracy of the planar motions of the vehicle including the longitudinal acceleration and the lateral acceleration as described above.

The vehicle behavior detection by the sensors has a high accuracy in a low-frequency region, but is liable to be influenced by the road surface in a high-frequency region. Thus, it is conceivable to use a low-pass filter for noise cut, but a high-frequency component cut of which is to be avoided ideally may also be lost through the application of the low-pass filter. For example, in a case in which the lateral acceleration is detected by the lateral acceleration sensor, when the vehicle body is tilted by a road surface input or the like, the lateral acceleration sensor detects also a vertical direction component. When a high-frequency component greatly influenced by the vertical direction component is removed, an original high-frequency component is also removed. As a result, the accuracy possibly decreases.

Thus, in the embodiment, sensor values (detection values) of the sensors (for example, the longitudinal acceleration sensor, the lateral acceleration sensor, and the yaw rate sensor) which can directly detect the planar motions or estimation values based on the sensor values are used in the low-frequency range, and estimation values based on the vehicle operation amounts (the engine torque, the brake pressure, and the steering angle) are used in the high-frequency range, to thereby obtain the planar motion amounts of the vehicle, consequently, the command values for the vehicle behavior control. As a result, the planar motion amounts of the vehicle including the longitudinal acceleration and the lateral acceleration can highly accurately be obtained. In this case, there can be used a configuration formed of different frequency filters (for example, software filters) being a low-pass filter and a high-pass filter, and hence a sensor other than sensors to be installed usually are not required. As a result, a cost can be reduced. Description is now given of those points.

As illustrated in FIG. 1 to FIG. 3, the vehicle control system according to this embodiment includes the shock absorbers 7 and 10 corresponding to the force generation mechanisms and the actuators and the controller 21 corresponding to the vehicle control device. Each of the shock absorbers 7 and 10 adjusts the force between the vehicle body 2 and each of the wheels 3 and 4 of the vehicle 1. That is, each of the shock absorbers 7 and 10 changes the force for suppressing the relative displacement between the vehicle body 2 and each of the wheels 3 and 4. The controller 21 controls the shock absorbers 7 and 10.

As illustrated in FIG. 2, the controller 21 includes a control command calculation unit 22 and a current output unit 23. To the control command calculation unit 22, the information (signals) corresponding to the state amounts of the vehicle 1, that is, the vehicle state information (vehicle state signals) is input via the communication line such as the CAN. Examples of the vehicle state information (vehicle state signals) include the detection values (detection signals) from the vehicle state detection means (state detection sensors), the control command values (control command signals) relating to the automatic control for the vehicle 1, and the operation command values (operation command signals) relating to an automatic operation for the vehicle 1. The control command calculation unit 22 calculates the control commands serving as the commands for the damping forces to be generated in the shock absorbers 7 and 10 based on the vehicle state information (vehicle state signals).

The control command calculation unit 22 outputs signals (control command signals) corresponding to the calculated control commands to the current output unit 23. To the current output unit 23, the control commands from the control command calculation unit 22 are input. The current output unit 23 has, for example, a current setting map which associates the "control command" and a "current (control current) of the damping force adjustment device 13 (solenoid 12)" with each other. The current output unit 23 calculates the currents (control currents) to be output (supplied) to the damping force adjustment devices 13 (solenoids 12) based on the control commands input from the control command calculation unit 22 and the current setting map.

The current output unit 23 outputs (supplies) the calculated currents (control currents) to the damping force adjustment devices 13 (solenoids 12) of the shock absorbers 7 and 10. As a result, the shock absorbers 7 and 10 can generate appropriate damping forces based on the vehicle state information, thereby being able to increase the ride comfort and/or the maneuverability and stability of the vehicle 1.

As illustrated in FIG. 2 and FIG. 3, the control command calculation unit 22 includes an acceleration calculation unit 24 which calculates accelerations (the longitudinal acceleration and the lateral acceleration) in the planar direction of the vehicle 1 in order to calculate the control commands based on the vehicle state information. The acceleration calculation unit 24 corresponds to a planer direction acceleration calculation unit (planar direction acceleration correction unit). Moreover, as illustrated in FIG. 9, the control command calculation unit 22 includes a vertical acceleration calculation unit 25. That is, in the embodiment, the control command calculation unit 22 includes the acceleration calculation unit 24 which calculates the longitudinal acceleration and the lateral acceleration of the vehicle 1 and the vertical acceleration calculation unit 25 which uses the longitudinal acceleration (composed longitudinal acceleration being the post-calculation longitudinal acceleration) and the lateral acceleration (composed lateral acceleration being the post-calculation lateral acceleration) calculated by the acceleration calculation unit 24 to calculate the vertical acceleration of the vehicle 1.

As described above, in the embodiment, the control command calculation unit 22 includes, in addition to the acceleration calculation unit 24, the vertical acceleration calculation unit 25. The control command calculation unit 22 may include, in addition to the acceleration calculation unit 24, for example, an inertia-caused body motion estimation unit 41 and a subtraction unit 42 as illustrated in FIG. 10 described later. Moreover, the control command calculation unit 22 may include, in addition to the acceleration calculation unit 24, for example, a vehicle vertical behavior estimation unit 43 as illustrated in FIG. 11 described later. Further, the control command calculation unit 22 may include, in addition to the acceleration calculation unit 24, for example, an anti-dive/squat control unit 44 and an anti-roll control unit 45 as illustrated in FIG. 12 described later.

In any case, the control command calculation unit 22 can include the acceleration calculation unit 24 corresponding to a first state calculation unit (first state estimation unit) and a second state calculation unit (second state estimation unit) which uses the calculation values (post-calculation longitudinal acceleration and post-calculation lateral acceleration) calculated by the acceleration calculation unit 24 to calculate (estimate) the state amounts (the motion amounts and the operation amounts) of the vehicle 1. The second state calculation unit (second state estimation unit) corresponds to the vertical acceleration calculation unit 25 of FIG. 9, the body motion estimation unit 41 of FIG. 10, or the vehicle vertical behavior estimation unit 43 of FIG. 11. Moreover, the control command calculation unit 22 may include the acceleration calculation unit 24 and a control calculation unit which uses the calculated values (post-calculation longitudinal acceleration and post-calculation lateral acceleration) calculated by the acceleration calculation unit 24 to calculate control commands. The control calculation unit corresponds to the anti-dive/squat control unit 44 and the anti-roll control unit 45 of FIG. 12.

Moreover, the control command calculation unit 22 may include, independently of the acceleration calculation unit 24, a third state calculation unit (third state estimation unit) (not shown) which uses the vehicle state information input to the control command calculation unit 22 to calculate (estimate) other vehicle state information (for example, a motion amount of the vehicle 1 and an operation amount of the vehicle 1). The third state calculation unit (third state estimation unit) is different from the second state calculation unit (second state estimation unit) in such a point that the third state calculation unit does not use, for the calculation (estimation), the calculated values (post-calculation longitudinal acceleration and post-calculation lateral acceleration) of the acceleration calculation unit 24 being the first state calculation unit (first state estimation unit). The acceleration calculation unit 24 calculates the accelerations (longitudinal acceleration and lateral acceleration) based on the vehicle state information input to the control command calculation unit 22 and/or the vehicle state information calculated (estimated) by the third state calculation unit (third state estimation unit).

As illustrated in FIG. 3, the acceleration calculation unit 24 (acceleration correction unit) which calculates (corrects) the accelerations in the planar direction of the vehicle 1 includes a longitudinal acceleration calculation unit 26 (longitudinal acceleration correction unit) which calculates (corrects) the longitudinal acceleration of the vehicle 1 and a lateral acceleration calculation unit 30 (lateral acceleration correction unit) which calculates (corrects) the lateral acceleration of the vehicle 1. The longitudinal acceleration calculation unit 26 includes a first longitudinal acceleration calculation unit 27, a second longitudinal acceleration calculation unit 28, and an addition unit 29. To the first longitudinal acceleration calculation unit 27, a detection value (longitudinal acceleration) of the longitudinal acceleration sensor being the vehicle state information is input. The longitudinal acceleration sensor detects the longitudinal acceleration of the vehicle 1. The longitudinal acceleration corresponds to the planar motion amount of the vehicle 1 (motion amount of the vehicle 1 in the planar direction). The first longitudinal acceleration calculation unit 27 removes a high-frequency component of the detection value (longitudinal acceleration detection value) of the longitudinal acceleration sensor, and outputs a longitudinal acceleration detection value obtained by removing the high-frequency component to the addition unit 29 as a first longitudinal acceleration calculation value (post-LPF longitudinal acceleration).

Thus, the first longitudinal acceleration calculation unit 27 includes an LPF 27A serving as a first calculation unit (first calculation means). To the LPF 27A being the low-pass filter, the detection value of the longitudinal acceleration sensor, that is, the longitudinal acceleration detection value is input. The LPF 27A removes the high-frequency component of the input longitudinal acceleration detection value, and outputs the longitudinal acceleration detection value obtained by removing the high-frequency component to the addition unit 29 as the first longitudinal acceleration calculation value (post-high-frequency-component-removal longitudinal acceleration).

To the second longitudinal acceleration calculation unit 28, the engine torque and the brake hydraulic pressure being the vehicle state information are input. The engine torque and the brake hydraulic pressure correspond to the operation amounts (mechanical behaviors and mechanical operation amounts) of the vehicle 1. The second longitudinal acceleration calculation unit 28 estimates (calculates) a braking/driving force based on the engine torque and the brake hydraulic pressure, and estimates (calculates) the longitudinal acceleration from a braking/driving estimation value. The second longitudinal acceleration calculation unit 28 removes a low-frequency component of the estimation value (longitudinal acceleration estimation value) of the longitudinal acceleration, and outputs an estimation value obtained by removing the low-frequency component to the addition unit 29 as a second longitudinal acceleration calculation value (post-HPF longitudinal acceleration). Thus, the second longitudinal acceleration calculation unit 28 includes a braking/driving force estimation unit (longitudinal acceleration estimation unit) 28A and an HPF 28B serving as a second calculation unit (second calculation means).

To the braking/driving force estimation unit 28A, the engine torque and the brake hydraulic pressure are input. The engine torque can be calculated (estimated) from, for example, the accelerator operation amount. Moreover, as the brake hydraulic pressure, a detection value of the brake hydraulic pressure sensor (master cylinder pressure detection sensor, wheel cylinder pressure detection sensors, or brake operation amount detection sensor) can be used. The engine torque and the brake hydraulic pressure may be detected by sensors, or calculation values (estimation values) may be used, or an accelerator command value and a brake command value may be used.

The braking/driving force estimation unit 28A estimates (calculates) the braking/driving force based on the engine torque and the brake hydraulic pressure, and estimates (calculates) the longitudinal acceleration from the braking/driving force estimation value. The braking/driving force estimation unit 28A estimates (calculates) the longitudinal acceleration, for example, as described below. That is, an engine-torque-based estimated longitudinal acceleration (Aeng) can be calculated as given by "Aeng=engine torque× AT gear ratio×final gear ratio×gear efficiency÷tire radius÷vehicle mass." A brake-hydraulic-pressure-based estimated longitudinal acceleration (Abrk) can be calculated through use of, for example, a proportional relationship between the brake hydraulic pressure and the longitudinal acceleration at the time of deceleration caused by a brake characteristic. That is, the brake-hydraulic-pressure-based estimated longitudinal acceleration (Abrk) can be calculated as given by "Abrk=α×d," where α is a proportional coefficient between a brake hydraulic pressure "d" and the longitudinal acceleration Abrk at the time of deceleration.

Moreover, when a vehicle mass M is considered, according to the Newton's law of motion "F=m×a," a force Fs acting on the vehicle is given by "Fs=Ms×α×d," where a is the proportional coefficient in the case of a reference mass Ms. In consideration of a fact that, when brake hydraulic pressures are equal to each other, forces acting on the vehicle are also equal to each other, "Ms×α×d=M×β×d," that is, "B=α×(Ms/M)" holds true. Thus, it is only required to set a proportional coefficient at the time of the mass M to "α× (Ms/M)." Thus, the brake-hydraulic-pressure-based estimated longitudinal acceleration Abrk is given by "Abrk=α× (Ms/M)×d." After that, the longitudinal acceleration is estimated (calculated) by subtracting the brake-hydraulic-pressure-based estimated longitudinal acceleration (Abrk) from the engine-torque-based estimated longitudinal acceleration (Aeng). When the longitudinal acceleration estimation value is smaller than 0, the longitudinal acceleration estimation value is set to 0. That is, the longitudinal acceleration estimation value ("e" of FIG. 3) is given by "e=max (Aeng-Abrk, 0)."

The braking/driving force estimation unit 28A outputs the estimation value of the longitudinal acceleration (longitudinal acceleration estimation value) to the HPF 28B. To the HPF 28B being the high-pass filter, the estimation value, that is, the longitudinal acceleration estimation value is input from the braking/driving force estimation unit 28A. The HPF 28B removes the low-frequency component of the input longitudinal acceleration estimation value, and outputs the longitudinal acceleration estimation value obtained by removing the low-frequency component to the addition unit 29 as the second longitudinal acceleration calculation value (post-low-frequency-component-removal longitudinal acceleration).

To the addition unit 29 serving as a third calculation unit (third calculation means), the first longitudinal acceleration calculation value (post-high-frequency-component-removal longitudinal acceleration) from the LPF 27A of the first longitudinal acceleration calculation unit 27 and the second longitudinal acceleration calculation value (post-low-frequency-component-removal longitudinal acceleration) from the HPF 28B of the second longitudinal acceleration calculation unit 28 are input. The addition unit 29 obtains a longitudinal acceleration (composed longitudinal acceleration) of the vehicle 1 based on the first longitudinal acceleration calculation value (post-high-frequency-component-removal longitudinal acceleration) and the second longitudinal acceleration calculation value (post-low-frequency-component-removal longitudinal acceleration). That is, the addition unit 29 adds the first longitudinal acceleration calculation value (post-high-frequency-component-removal longitudinal acceleration) and the second longitudinal acceleration calculation value (post-low-frequency-component-removal longitudinal acceleration) to each other, and outputs the longitudinal acceleration obtained by the addition to the vertical acceleration calculation unit 25 of FIG. 9 as a third longitudinal acceleration calculation value (composed longitudinal acceleration). The third longitudinal acceleration calculation value (composed longitudinal acceleration) may be output to, for example, the body motion estimation unit 41 of FIG. 10, the vehicle vertical behavior estimation unit 43 of FIG. 11, or the anti-dive/squat control unit 44 of FIG. 12.

As described above, the longitudinal acceleration calculation unit 26 includes the LPF 27A serving as the first calculation unit (first calculation means), the HPF 28B serving as the second calculation unit (second calculation means), and the addition unit 29 serving as the third calculation unit (third calculation means). The LPF 27A acquires the longitudinal acceleration (longitudinal acceleration detection value) of the vehicle 1 detected by the longitudinal acceleration sensor provided to the vehicle 1, and removes the high-frequency component. The longitudinal acceleration sensor corresponds to the sensor, and the longitudinal acceleration corresponds to the planar motion amount of the vehicle 1. The HPF 28B acquires the longitudinal acceleration (longitudinal acceleration estimation value) of the vehicle 1 estimated based on the engine torque and the brake hydraulic pressure of the vehicle 1, and removes the low-frequency component. The engine torque and the brake hydraulic pressure correspond to the operation amounts (mechanical behaviors) of the vehicle 1.

The addition unit 29 obtains the composed longitudinal acceleration (third longitudinal acceleration calculation value) being the longitudinal acceleration of the vehicle 1 based on the "post-high-frequency-component-removal longitudinal acceleration (first longitudinal acceleration calculation value) being the longitudinal acceleration obtained by removing the high-frequency component by the LPF 27A" and the "post-low-frequency-component-removal longitudinal acceleration (second longitudinal acceleration calculation value) being the longitudinal acceleration obtained by removing the low-frequency component by the HPF 28B." A frequency region (cutoff frequency) to be removed by the LPF 27A and a frequency region (cutoff frequency) to be removed by the HPF 28B can be determined such that a gain of a sum of the post-high-frequency-component-removal longitudinal acceleration (first longitudinal acceleration calculation value) and the post-low-frequency-component-removal longitudinal acceleration (second longitudinal acceleration calculation value) is 1. For example, when a low-pass filter (LPF) and a high-pass filter (HPF) each of which has a gain reduced to a half at the cutoff frequency are used, the cutoff frequencies both thereof can be set to the same value (for example. 1 Hz). Moreover, as specific values, for example, the cutoff frequency of the low-pass filter (LPF) can be set to 0.9 Hz and the cutoff frequency of the high-pass filter (HPF) can be set to 2.72 Hz, which depends on the type of filter.

The lateral acceleration calculation unit 30 includes a first lateral acceleration calculation unit 31, a second lateral acceleration calculation unit 32, and an addition unit 33. To the first lateral acceleration calculation unit 31, the detection value (yaw rate) of the yaw rate sensor and the vehicle speed being the vehicle state information are input. The yaw rate sensor detects the yaw rate of the vehicle 1. The first lateral acceleration calculation unit 31 estimates (calculates) a lateral acceleration (first lateral acceleration) based on the detection value of the yaw rate sensor and the vehicle speed. The yaw rate and the lateral acceleration correspond to the planar motion amounts of the vehicle 1 (the motion amounts of the vehicle 1 in the planar direction). The first lateral acceleration calculation unit 31 removes a high-frequency component of the estimation value (first lateral acceleration estimation value) of the lateral acceleration, and outputs an estimation value obtained by removing the high-frequency component to the addition unit 33 as a first lateral acceleration calculation value (post-LPF lateral acceleration). Thus, the first lateral acceleration calculation unit 31 includes a first lateral acceleration estimation unit 31A and an LPF 31B serving as a first calculation unit (first calculation means).

To the first lateral acceleration estimation unit 31A, the detection value of the yaw rate sensor and the vehicle speed are input. The vehicle speed may be detected by a sensor, or a calculation value (estimation value) may be used. The first lateral acceleration estimation unit 31A estimates (calculates) the lateral acceleration based on the detection value of the yaw rate sensor and the vehicle speed. When "the lateral acceleration is represented by Ay, the yaw rate is represented by γ, and the vehicle speed is represented by Vx," a relationship "Ay=γ×Vx" is satisfied. The first lateral acceleration estimation unit 31A outputs the estimation value of the lateral acceleration (first lateral acceleration estimation value) to the LPF 31B. To the LPF 31B being the low-pass filter, the estimation value, that is, the first lateral acceleration estimation value is input from the first lateral acceleration estimation unit 31A. The LPF 31B removes the high-frequency component of the input first lateral acceleration estimation value, and outputs the first lateral acceleration estimation value obtained by removing the high-frequency component to the addition unit 33 as the first lateral acceleration calculation value (post-high-frequency-component-removal lateral acceleration).

To the second lateral acceleration calculation unit 32, the steering angle and the vehicle speed being the vehicle state information are input. The steering angle corresponds to the operation amount (mechanical behavior and mechanical operation amount) of the vehicle 1. The second lateral acceleration calculation unit 32 estimates (calculates) a lateral acceleration (second lateral acceleration) based on the steering angle and the vehicle speed. The calculation of the lateral acceleration is described in, for example, JP 2013-241075 A. The second lateral acceleration calculation unit 32 removes a low-frequency component of the estimation value of the lateral acceleration (second lateral acceleration estimation value), and outputs an estimation value obtained by removing the low-frequency component to the addition unit 33 as a second lateral acceleration calculation value (post-HPF lateral acceleration). Thus, the second lateral acceleration calculation unit 32 includes a second lateral acceleration estimation unit 32A and an HPF 32B serving as a second calculation unit (second calculation means).

To the second lateral acceleration estimation unit 32A, the steering angle and the vehicle speed are input. As the steering angle, for example, a detection value of the steering angle sensor (steering sensor) can be used. The steering angle may be detected by a sensor, or a calculation value (estimation value) may be used, or a steering command value may be used. The second lateral acceleration estimation unit 32A estimates (calculates) the lateral acceleration based on the steering angle and the vehicle speed. The second lateral acceleration estimation unit 32A outputs the estimation value of the lateral acceleration (second lateral acceleration estimation value) to the HPF 32B. To the HPF 32B being the high-pass filter, the estimation value, that is, the second lateral acceleration estimation value is input from the second lateral acceleration estimation unit 32A. The HPF 32B removes the low-frequency component of the input second lateral acceleration estimation value, and outputs the second lateral acceleration estimation value obtained by removing the low-frequency component to the addition unit 33 as the second lateral acceleration calculation value (post-low-frequency-component-removal lateral acceleration).

To the addition unit 33 as a third calculation unit (third calculation means), the first lateral acceleration calculation value (post-high-frequency-component-removal lateral acceleration) from the LPF 31B of the first lateral acceleration calculation unit 31 and the second lateral acceleration calculation value (post-low-frequency-component-removal lateral acceleration) from the HPF 32B of the second lateral acceleration calculation unit 32 are input. The addition unit 33 obtains a lateral acceleration (composed lateral acceleration) of the vehicle 1 based on the first lateral acceleration calculation value (post-high-frequency-component-removal lateral acceleration) and the second lateral acceleration calculation value (post-low-frequency-component-removal lateral acceleration). That is, the addition unit 33 adds the first lateral acceleration calculation value (post-high-frequency-component-removal lateral acceleration) and the second lateral acceleration calculation value (post-low-frequency-component-removal lateral acceleration) to each other, and outputs the lateral acceleration obtained by the addition to the vertical acceleration calculation unit 25 of FIG. 9 as a third lateral acceleration calculation value (composed lateral acceleration). The third lateral acceleration calculation value (composed lateral acceleration) may be output to, for example, the body motion estimation unit 41 of FIG. 10, the vehicle vertical behavior estimation unit 43 of FIG. 11, or the anti-roll control unit 45 of FIG. 12.

As described above, the lateral acceleration calculation unit 30 includes the LPF 31B serving as the first calculation unit (first calculation means), the HPF 32B serving as the second calculation unit (second calculation means), and the addition unit 33 serving as the third calculation unit (third calculation means). The LPF 31B acquires the lateral acceleration (first lateral acceleration estimation value) of the vehicle 1 estimated based on the detection value (yaw rate) detected by the yaw rate sensor provided to the vehicle 1, and removes the high-frequency component. More specifically, the LPF 31B acquires the lateral acceleration (first lateral acceleration estimation value) estimated based on the speed (vehicle speed) of the vehicle 1 and the yaw rate detection value detected by the yaw rate sensor, and removes the high-frequency component. The yaw rate sensor corresponds to the sensor, and the lateral acceleration corresponds to the planar motion amount of the vehicle 1.

The HPF 32B acquires the lateral acceleration (second lateral acceleration estimation value) of the vehicle 1 estimated based on the steering angle of the vehicle 1, and removes the low-frequency component. More specifically, the HPF 32B acquires the lateral acceleration (second lateral acceleration estimation value) of the vehicle 1 estimated based on the steering angle of the vehicle 1 and the speed (vehicle speed) of the vehicle 1, and removes the low-frequency component. The steering angle corresponds to the operation amount (mechanical behavior) of the vehicle 1

The addition unit 33 obtains the composed lateral acceleration (third lateral acceleration calculation value) being the lateral acceleration of the vehicle 1 based on the "post-high-frequency-component-removal lateral acceleration (first lateral acceleration calculation value) being the lateral acceleration obtained by removing the high-frequency component by the LPF 31B" and the "post-low-frequency-component-removal lateral acceleration (second lateral acceleration calculation value) being the lateral acceleration obtained by removing the low-frequency component by the HPF 32B." A frequency region (cutoff frequency) to be removed by the LPF 31B and a frequency region (cutoff frequency) to be removed by the HPF 32B can be determined such that a gain of a sum of the post-high-frequency-component-removal lateral acceleration (first lateral acceleration calculation value) and the post-low-frequency-component-removal lateral acceleration (second lateral acceleration calculation value) is 1. For example, when a low-pass filter (LPF) and a high-pass filter (HPF) each of which has a gain reduced to a half at the cutoff frequency are used, the cutoff frequencies both thereof can be set to the same value (for example, 1 Hz). Moreover, as specific values, for example, the cutoff frequency of the low-pass filter (LPF) can be set to 0.9 Hz and the cutoff frequency of the high-pass filter (HPF) can be set to 2.72 Hz, which depends on the type of filter.

The "composed longitudinal acceleration (third longitudinal acceleration calculation value)" calculated by the longitudinal acceleration calculation unit 26 and the "composed lateral acceleration (third lateral acceleration calculation value" calculated by the lateral acceleration calculation unit 30 can be used as described below. For example, as illustrated in FIG. 9, the "composed longitudinal acceleration" and the "composed lateral acceleration" can be used to remove a longitudinal acceleration component and a lateral acceleration component overlapping with the detection value of the sprung vertical acceleration. In this case, the control command calculation unit 22 includes the vertical acceleration calculation unit 25 (vertical acceleration correction unit) in addition to the acceleration calculation unit 24 (planar direction acceleration correction unit). To the vertical acceleration calculation unit 25, the composed longitudinal acceleration and the composed lateral acceleration from the acceleration calculation unit 24 are input. Moreover, to the vertical acceleration calculation unit 25, the detection value (pre-correction vertical acceleration) from the vertical acceleration sensor is input. The vertical acceleration calculation unit 25 calculates a vertical acceleration (post-correction vertical acceleration) obtained by removing the longitudinal acceleration component and the lateral acceleration component based on the composed longitudinal acceleration, the composed lateral acceleration, and the detection value (pre-correction vertical acceleration).

For example, a longitudinal acceleration vertical component is calculated as given by "longitudinal acceleration vertical component $[m/s^2]=-\{$composed longitudinal acceleration $[m/s^2]\times$sin($|$pitch angle $[rad]|)\}$." The pitch angle $[rad]$ is a sufficiently small value, and hence "sin $\theta\approx\theta$" holds true. Thus, "sin($|$pitch angle $[rad]|)\sim|$pitch angle $[rad]|$" can be considered to hold true. In this case, a calculation load can be reduced. As a calculation method for the pitch angle, a method as described in JP 2021-023234 may be used.

For example, a lateral acceleration vertical component is calculated as given by "lateral acceleration vertical component $[m/s^2]=-\{$composed lateral acceleration $[m/s^2]\times$sin ($|$roll angle $[rad]|)\}$." The roll angle $[rad]$ is a sufficiently small value, and hence "sin $\varphi\approx\varphi$" holds true. Thus, "sin($|$roll angle $[rad]|)\approx|$roll angle $[rad]|$" can be considered to hold true. In this case, a calculation load can be reduced. As a calculation method for the roll angle, a method as described in JP 2021-023234 may be used. A post-correction vertical acceleration ("s" of FIG. 9) is obtained by subtracting the longitudinal acceleration vertical component and the lateral acceleration vertical component from the pre-correction vertical acceleration ("r" of FIG. 9). That is, the post-correction vertical acceleration is given by "S=r-longitudinal acceleration vertical component-lateral acceleration vertical component."

The vertical acceleration calculation unit 25 outputs the calculated vertical acceleration (post-correction vertical acceleration). As a result, the control command calculation unit 22 can calculate the control command serving as the command for the damping force to be generated by each of the shock absorbers 7 and 10 based on the vertical acceleration (post-correction vertical acceleration) obtained by removing the longitudinal acceleration component and the lateral acceleration component, that is, a highly accurate vertical acceleration.

Moreover, for example, as illustrated in FIG. 10, the post-correction vertical acceleration can be used to extract a component caused by road surface input from a detection value of a relative displacement (relative speed) in the vertical direction. In this case, the control command calculation unit 22 can include, in addition to the acceleration calculation unit 24, the inertia-caused body motion estimation unit 41 and the subtraction unit 42. To the body motion estimation unit 41, the composed longitudinal acceleration and the composed lateral acceleration from the acceleration calculation unit 24 are input. The body motion estimation unit 41 calculates (estimates) the relative displacements caused by the inertia (relative displacements caused by the acceleration/deceleration) based on the composed longitudinal acceleration and the composed lateral acceleration. The calculation of the relative displacements caused by the inertia (relative displacements caused by the acceleration/deceleration) is described in, for example, WO 2019/187223 A1. The body motion estimation unit 41 outputs the calculated (estimated) relative displacements caused by the inertia to the subtraction unit 42.

To the subtraction unit 42, the detection values (relative displacements) from the vehicle height sensors each of which detects the relative displacement (relative displacement in the vertical direction) between the vehicle body and the wheel are input. Moreover, to the subtraction unit 42, the relative displacements which are caused by the inertia and are calculated (estimated) by the body motion estimation unit 41 are input. The subtraction unit 42 calculates each relative displacement caused by the road surface by subtracting each of the relative displacements caused by the inertial from each of the relative displacements from the vehicle height sensors. The subtraction unit 42 outputs the calculated relative displacements caused by the road surface. As a result, the control command calculation unit 22 can calculate the control command serving as the command for the damping force to be generated by each of the shock absorbers 7 and 10 based on the relative displacements (relative displacements caused by the road surface) obtained by removing the relative displacements caused by the inertia, that is, a highly accurate relative displacements. The relative speeds may be used in place of the relative displacements.

Moreover, for example, as illustrated in FIG. 11, the post-correction vertical acceleration may be used to estimate variation components caused by the planar motions. In this case, the control command calculation unit 22 can include the vehicle vertical behavior estimation unit 43 which estimates behaviors (sprung speed and the like) of the vehicle 1 in the vertical direction, in addition to the acceleration calculation unit 24. To the vehicle vertical behavior estimation unit 43, the composed longitudinal acceleration and the composed lateral acceleration are input from the acceleration calculation unit 24. Moreover, to the vehicle vertical behavior estimation unit 43, detection values (wheel speeds) from the wheel speed sensors which detect rotation speeds (wheel speeds) of the wheels 3 and 4 of the vehicle 1 are input. Further, although not shown, to the vehicle vertical behavior estimation unit 43, vehicle state information required to calculate (estimate) the behaviors (sprung speeds and the like) of the vehicle 1 in the vertical direction based on the wheel speeds is input.

The vehicle vertical behavior estimation unit 43 calculates (estimates) the behaviors (sprung speed and the like) of the vehicle 1 in the vertical direction based on the composed longitudinal acceleration, the composed lateral acceleration, the wheel speeds, and other required vehicle state information. Thus, the vehicle vertical behavior estimation unit 43 has, for example, a state equation for calculating (estimating) the behaviors (sprung speeds and the like) of the vehicle 1 in the vertical direction based on the composed longitudinal acceleration, the composed lateral acceleration, the wheel speeds, and the other required vehicle state information. The vehicle vertical behavior estimation unit 43 uses the state equation to calculate (estimate) the behaviors (sprung speeds and the like) of the vehicle in the vertical direction from the composed longitudinal acceleration, the composed lateral acceleration, the wheel speeds, and the other required vehicle state information. The calculation of the behaviors (sprung speeds and the like) of the vehicle in the vertical direction is described in, for example, JP 2020-100249 A. The vehicle vertical behavior estimation unit 43 outputs the calculated (estimated) vehicle vertical behaviors (sprung speeds and the like). As a result, the control command calculation unit 22 can calculate the control command serving as the command for the damping force to be generated by each of the shock absorbers 7 and 10 based on a highly accurate behaviors (sprung speeds and the like) in the vertical direction. The relative speeds may be used in place of the relative displacements.

Moreover, for example, as illustrated in FIG. 12, the post-correction vertical acceleration may be used as an input signal for the anti-dive/squat control and the anti-roll control. In this case, the control command calculation unit 22 can include, in addition to the acceleration calculation unit 24, the anti-dive/squat control unit 44 and the anti-roll control unit 45. To the anti-dive/squat control unit 44, the composed longitudinal acceleration from the acceleration calculation unit 24 is input. The anti-dive/squat control unit 44 calculates a control command capable of suppressing a dive and a squat of the vehicle 1 based on the composed longitudinal acceleration, and outputs this control command. As the simplest method, for example, the anti-dive/squat control unit 44 multiplies the longitudinal acceleration (composed longitudinal acceleration) by a proportional coefficient, and output the product as the control command value. The anti-dive/squat control for a semi-active suspension is described in, for example, JP 2011-173503 A.

To the anti-roll control unit 45, the composed lateral acceleration from the acceleration calculation unit 24 is input. The anti-roll control unit 45 calculates a control command capable of suppressing a roll of the vehicle 1 based on the composed lateral acceleration, and outputs this control command. As the simplest method, for example, the anti-roll control unit 45 multiplies the lateral acceleration (composed lateral acceleration) by a proportional coefficient, and output the product as the control command value. The anti-roll control for a semi-active suspension is described in, for example, JP 2012-71630 A and JP 2012-46172 A. The anti-roll control for an active suspension is described in, for example. JP 2008-230466 A. The control command calculation unit 22 can use a highly accurate composed longitudinal acceleration and composed lateral acceleration to execute the anti-dive/squat control and the anti-roll control.

In any case, as illustrated in FIG. 3, according to the embodiment, for the longitudinal acceleration, the low-pass filter processing is applied to the detection value of the longitudinal acceleration sensor, to thereby remove the high-frequency component. Meanwhile, the high-pass filter processing is applied to the estimation value based on the engine torque and the brake hydraulic pressure (longitudinal acceleration estimation value based on the braking/driving force estimation value), to thereby remove the low-frequency component. Finally, both thereof are added to each other, to thereby calculate the sum as the longitudinal acceleration. For the lateral acceleration, the low-pass filter processing is applied to the first lateral acceleration estimation value calculated from the detection value of the yaw rate sensor and the vehicle speed, to thereby remove the high-frequency component. Meanwhile, the high-pass filter processing is applied to the second lateral acceleration estimation value based on the steering angle and the vehicle speed, to thereby remove the low-frequency component. Finally, both thereof are added to each other, to thereby calculate the sum as the lateral acceleration.

FIG. 4 shows longitudinal acceleration data (temporal change in longitudinal acceleration) in a case of acceleration on a smooth good road. The sensor value (longitudinal acceleration sensor detection value) has been caused to pass through the low-pass filter, and hence a lag occurs in each of a rise and a fall. Moreover, the senser value does not follow a theoretical value. Meanwhile, the estimation value (longitudinal acceleration estimation value) based on the braking/driving force follows the theoretical value on a rise from 15 [s] to 19 [s] and in subsequent increases and decreases, but an error occurs in a steady state from 14 [s] to 15 [s]. In contrast, the composed longitudinal acceleration does not have the steady-state error, and also follows the rise and the subsequent increases and decreases.

Next, FIG. 5 shows the longitudinal acceleration data (temporal change in longitudinal acceleration) at the time of deceleration. Similarly, also at the time of the deceleration, a lag occurs in each of a rise and a fall of the sensor value (longitudinal acceleration sensor detection value). Moreover, a steady-state error occurs in the estimation value (longitudinal acceleration estimation value) from 60 [s] to 70 [s]. In contrast, the composed longitudinal acceleration can follow the rise and the fall, and does not have the steady-state error. That is, the composed longitudinal acceleration is highly accurate.

FIG. 6 and FIG. 7 show lateral acceleration data (temporal changes in lateral acceleration) at the time of sweep steering. In FIG. 6 and FIG. 7, as a reference value, a characteristic of the sensor value of the lateral acceleration sensor (lateral acceleration sensor detection value) provided to the vehicle 1 is also shown. FIG. 6 shows the lateral acceleration at a steering frequency of about 0.1 Hz. As apparent from FIG. 6 as described above, the estimation value based on the yaw rate and the composed lateral acceleration are highly accurate.

FIG. 7 shows the lateral acceleration at a steering frequency of from about 0.5 Hz to about 1 Hz. As apparent from FIG. 7 as described above, compared with the estimation value based on the yaw rate and the estimation value based on the steering angle, the composed lateral acceleration is highly accurate both in phase and amplitude. Moreover, compared with the sensor value (lateral acceleration sensor detection value), the composed lateral acceleration is highly accurate both in phase and amplitude.

FIG. 8 shows frequency characteristics of the sensor value (lateral acceleration sensor detection value), the estimation value based on the yaw rate, the estimation value based on the steering angle, and the composed lateral acceleration with respect to theoretical values. The composed lateral acceleration has smaller errors in gain and phase compared with the estimation value based on the yaw rate and the estimation value based on the steering angle in a frequency band of FIG. 8.

The vehicle control system according to the embodiment bas the configuration as described above. Description is now given of the operation thereof.

When the behaviors (state) of the vehicle 1 change as a result of, for example, travel of the vehicle 1, this change in behaviors is detected by the vehicle state detection means (various state detection sensors) mounted to the vehicle 1. The detected change is input to the controller 21 which controls the shock absorbers 7 and 10. The controller 21 controls the shock absorbers 7 and 10 (adjusts the damping forces) based on the various types of vehicle state information (vehicle state signals) including the detection values from the vehicle state detection means (state detection sensors) and the commands (control commands, operation commands, and command signals) relating to the automatic control for the vehicle. At this time, the controller 21 uses the longitudinal acceleration (third longitudinal acceleration calculation value) and the lateral acceleration (third lateral acceleration calculation value) which are calculated by the acceleration calculation unit 24, to calculate the currents (command currents) to be output (supplied) to the damping force adjustment devices 13 (solenoids 12) of the shock absorbers 7 and 10. The controller 21 outputs (supplies) the calculated currents (command currents) to the damping force adjustment devices 13 (solenoids 12) of the shock absorbers 7 and 10.

In the embodiment, the controller 21 can remove an unnecessary high-frequency component from the longitudinal acceleration detection value detected by the longitudinal acceleration sensor of the vehicle 1. Moreover, the controller 21 can remove an unnecessary low-frequency component from the longitudinal acceleration estimation value estimated based on the engine torque and the brake hydraulic pressure being the operation amounts of the vehicle 1. After that, the controller 21 can use the "post-high-frequency-component-removal longitudinal acceleration being the post-correction longitudinal acceleration obtained by removing an unnecessary high-frequency component from the longitudinal acceleration detection value" and the "post-low-frequency-component-removal longitudinal acceleration being the post-correction longitudinal acceleration obtained by removing an unnecessary low-frequency component from the longitudinal acceleration estimation value" to obtain the longitudinal acceleration of the vehicle 1. Thus, the longitudinal acceleration of the vehicle 1 can highly accurately be obtained.

Moreover, the controller 21 can remove an unnecessary high-frequency component from the first lateral acceleration estimation value estimated based on the detection value detected by the yaw rate sensor. More specifically, the controller 21 can remove an unnecessary high-frequency component from the first lateral acceleration estimation value estimated based on the speed (vehicle speed) of the vehicle 1 and the yaw rate detection value detected by the yaw rate sensor. Moreover, the controller 21 can remove an unnecessary low-frequency component from the second lateral acceleration estimation value estimated based on the steering angle being the operation amount of the vehicle 1. More specifically, the controller 21 can remove an unnecessary low-frequency component from the second lateral acceleration estimation value estimated based on the speed (vehicle speed) of the vehicle 1 and the steering angle being the operation amount of the vehicle 1. After that, the controller 21 can use the "post-high-frequency-component-removal lateral acceleration being the lateral acceleration obtained by removing an unnecessary high-frequency component from the first lateral acceleration estimation value" and the "post-low-frequency-component-removal lateral acceleration being the lateral acceleration obtained by removing an unnecessary low-frequency component from the second lateral acceleration estimation value" to obtain the lateral acceleration of the vehicle 1. Thus, the lateral acceleration of the vehicle 1 can highly accurately be obtained.

In the embodiment, the frequency region to be removed by the LPF 27A of the longitudinal acceleration calculation unit 26 and the frequency region to be removed by the HPF 28B thereof are determined such that the gain of the sum of the post-high-frequency-component-removal longitudinal acceleration and the post-low-frequency-component-removal longitudinal acceleration is 1. As a result, it is possible to determine the frequency regions which enable the longitudinal acceleration of the vehicle 1 to be highly accurately obtained.

In the embodiment, the frequency region to be removed by the LPF 31B of the lateral acceleration calculation unit 30 and the frequency region to be removed by the HPF 32B thereof are determined such that the gain of the sum of the post-high-frequency-component-removal lateral acceleration and the post-low-frequency-component-removal lateral acceleration is 1. As a result, it is possible to determine the frequency regions which enable the lateral acceleration of the vehicle 1 to be highly accurately obtained.

In the embodiment, the case in which the frequency region to be removed by the LPF 27A of the longitudinal acceleration calculation unit 26 and the frequency region to be removed by the HPF 28B thereof are not changed regardless of a change in the speed (vehicle speed) of the vehicle 1 has been exemplified for description. However, the configuration is not limited to this case, and, for example, the frequency region to be removed by the LPF 27A of the longitudinal acceleration calculation unit 26 and the frequency region to be removed by the HPF 28B thereof may be determined based on the speed (vehicle speed) of the vehicle 1. That is, the frequency region to be removed by the LPF 27A of the longitudinal acceleration calculation unit 26 and the frequency region to be removed by the HPF 28B thereof may be changed in accordance with the speed of the vehicle 1. In this case, the longitudinal acceleration of the vehicle 1 can highly accurately be obtained regardless of the speed of the vehicle 1 (regardless of whether the speed is high or low).

In the embodiment, the case in which the frequency region to be removed by the LPF 31B of the lateral acceleration calculation unit 30 and the frequency region to be removed by the HPF 32B thereof are not changed regardless of a change in the speed (vehicle speed) of the vehicle 1 has been exemplified for description. However, the configuration is not limited to this case, and, for example, the frequency region to be removed by the LPF 31B of the lateral acceleration calculation unit 30 and the frequency region to be removed by the HPF 32B thereof may be determined based on the speed (vehicle speed) of the vehicle 1. That is, the frequency region to be removed by the LPF 31B of the lateral acceleration calculation unit 30 and the frequency region to be removed by the HPF 32B thereof may be changed in accordance with the speed of the vehicle 1. In this case, the lateral acceleration of the vehicle 1 can highly accurately be obtained regardless of the speed of the vehicle 1 (regardless of whether the speed is high or low).

In any case, for example, as the vehicle speed increases, the frequency region to be removed by the first calculation unit (LPF: low-pass filter) can be caused to transition to a lower frequency (the cutoff frequency is lowered), and the frequency region to be removed by the second calculation unit (HPF: high-pass filter) can be caused to transition to a lower frequency (the cutoff frequency is lowered). Further, for example, as the vehicle speed decreases, the frequency region to be removed by the first calculation unit (LPF: low-pass filter) can be caused to transition to a higher frequency (the cutoff frequency is raised), and the frequency region to be removed by the second calculation unit (HPF: high-pass filter) can be caused to transition to a higher frequency (the cutoff frequency is raised). Moreover, the relationship between the vehicle speed and each of the cutoff frequencies may be given by a linear function or a quadratic function (for example, a change in cutoff frequency may be changed in accordance with an increase in vehicle speed).

In the embodiment, as the vehicle state detection means, the longitudinal acceleration sensor, the lateral acceleration sensor, the wheel speed sensor, the steering angle sensor, the yaw rate sensor, the vehicle speed sensor, the vehicle height sensor, the sprung vertical acceleration sensor, the sprung vertical speed sensor, the unsprung vertical acceleration sensor, the unsprung vertical speed sensor, the engine torque sensor, the brake hydraulic pressure sensor, and the like have been exemplified for description. However, the vehicle state detection means are not limited thereto, and, for example, as the vehicle state detection means, sensors other than the exemplified sensors, such as a stroke sensor, a displacement sensor, and a preview sensor (external world recognition sensor), may be used. As the preview sensor (external world recognition sensor), for example, a camera (for example, digital camera) such as a stereo camera and a single camera and/or a radar (for example, a light emitting element such as a semiconductor laser, and a light receiving element for receiving the emitted light) such as a laser radar, an infrared radar, and a millimeter wave radar, a LIDAR sensor, and a sonar can be used.

In the embodiment, the case in which each of the damping force adjustable shock absorbers 7 and 10 is used as the force generation mechanism (actuator) has been exemplified for description. In this case, the case in which the damping force adjustable hydraulic shock absorber, that is, the semi-active damper of the hydraulic type is used as each of the damping force adjustable shock absorbers 7 and 10 has been exemplified for description. However, the damping force adjustable shock absorber is not limited to this example, and, as the damping force adjustable shock absorber, a semi-active damper of another type such as an ER damper (electrorheological fluid damper) may be used. Further, as the force generation mechanism (actuator), a full-active damper formed of a force generation mechanism capable of generating a thrust, that is, a hydraulic actuator, an electric actuator, or a pneumatic actuator may be used. That is, as the force generation mechanism (actuator), it is possible to use various force generation mechanisms (actuators) such as a damping force variable hydraulic damper, an electrorheological fluid damper, a pneumatic damper, an electromagnetic damper, a hydraulic actuator, an electric actuator, and a pneumatic actuator.

In the embodiment, the case in which the acceleration calculation unit 24 (longitudinal acceleration calculation unit 26 and lateral acceleration calculation unit 30) is built into the ECU for the suspensions (ECU for the shock absorbers), that is, the controller 21 for the suspension system (suspension control device) has been exemplified for description. However, the configuration is not limited to this example, and the acceleration calculation unit (longitudinal acceleration calculation unit and lateral acceleration calculation unit) which calculates the planar motion amounts of the vehicle may be built into a controller (ECU) other than the controller (ECU) for the suspension system, for example, a controller (ECU) which controls braking devices (electric brake, electric booster, and hydraulic pressure supply device) of the vehicle, a controller (ECU) which controls a steering device (electric steering device) thereof, a controller (ECU) which controls drive devices (engine, electric motor, electric differential gear device, torque control device, and the like) thereof, and the like. In this case, the planar motion amounts can be output from a controller (ECU) which calculates the planar motion amounts (for example, the longitudinal acceleration and the lateral acceleration) to the controller (ECU) for the suspension system.

In the embodiment, the case in which the damping force adjustable shock absorbers 7 and 10 and the controller 21 are mounted to the automobile serving as the vehicle has been exemplified for description. However, the vehicle is not limited to the automobile, and the damping force adjustable shock absorbers 7 and 10 and the controller 21 can be mounted to various vehicles other than the automobile, such as a railway vehicle and a service vehicle.

According to the above-mentioned embodiment, it is possible to remove unnecessary high-frequency components from the "planar motion amount of the vehicle detected by the sensor" or the "planar motion amount of the vehicle estimated based on the detection values detected by the sensors." Moreover, it is possible to remove unnecessary low-frequency components from the "planar motion amounts of the vehicle estimated based on the operation amounts of the vehicle." After that, it is possible to use the "post-high-frequency-component-removal planar motion amounts" obtained by removing unnecessary high-frequency components and the "post-low-frequency-component-removal planar motion amounts" obtained by removing unnecessary low-frequency components to obtain the planar motion amounts of the vehicle. Thus, the planar motion amounts of the vehicle can highly accurately be obtained.

According to the embodiment, the planar motion amount is the lateral acceleration. Moreover, it is possible to remove an unnecessary high-frequency component from the lateral acceleration estimated based on the speed of the vehicle and the yaw rate detection value detected by the yaw rate sensor. Thus, the lateral acceleration of the vehicle can highly accurately be obtained.

According to the embodiment, the frequency region to be removed by the first calculation unit (first calculation means) and the frequency region to be removed by the second calculation unit (second calculation means) are determined based on the speed of the vehicle. Thus, the planar motion amount of the vehicle can highly accurately be obtained regardless of the speed of the vehicle (regardless of whether the speed is high or low).

According to the embodiment, the frequency region to be removed by the first calculation unit (first calculation means) and the frequency region to be removed by the second calculation unit (second calculation means) are determined such that the gain of the sum of the post-high-frequency-component-removal planar motion amount and the post-low-frequency-component-removal planar motion amount is 1. As a result, it is possible to determine the frequency regions which enable the planar motion amount of the vehicle to be highly accurately obtained.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-156440 filed on Sep. 27, 2021. All disclosed contents including Specification, Scope of Claims, Drawings, and Abstract of Japanese Patent Application No. 2021-156440 filed on Sep. 27, 2021 are incorporated herein by reference in their entirety.

REFERENCE SIGNS LIST

1: vehicle, 2: vehicle body, 3: front wheel (wheel), 4: rear wheel (wheel), 7, 10: shock absorber (actuator, force generation mechanism), 21: controller (vehicle control device), 24: acceleration calculation unit (planar direction acceleration calculation unit), 26: longitudinal acceleration calculation unit, 27A, 31B: LPF (first calculation unit, first calculation means), 28B, 32B: HPF (second calculation unit, second calculation means), 29, 33: addition unit (third calculation unit, third calculation means), 30: lateral acceleration calculation unit

The invention claimed is:

1. A vehicle control device for controlling an actuator which is provided between a body of a vehicle and a wheel of the vehicle, and configured to change a force for suppressing a relative displacement between the body of the vehicle and the wheel of the vehicle, the vehicle control device comprising:

a first lateral acceleration calculation unit configured to estimate a first lateral acceleration of the vehicle based on a yaw rate of the vehicle detected by a yaw rate sensor and a speed of the vehicle detected by a vehicle speed sensor, and remove a high-frequency component of the first lateral acceleration;

a second lateral acceleration calculation unit configured to estimate a second lateral acceleration of the vehicle based on a steering operation amount of the vehicle, and remove a low-frequency component of the second lateral acceleration;

a third lateral acceleration calculation unit configured to obtain a composed lateral acceleration of the vehicle based on a post-high-frequency-component-removal lateral acceleration obtained by removing the high-frequency component by the first lateral acceleration calculation unit and a post-low-frequency-component-removal lateral acceleration obtained by removing the low-frequency component by the second lateral acceleration calculation unit;

a first longitudinal acceleration calculation unit configured to remove a high-frequency component of a first longitudinal acceleration of the vehicle detected by a longitudinal acceleration sensor;

a second longitudinal acceleration calculation unit configured to estimate a second longitudinal acceleration of the vehicle based on a braking or driving operation amount of the vehicle, and remove a low-frequency component of the second longitudinal acceleration;

a third longitudinal acceleration calculation unit configured to obtain a composed longitudinal acceleration of the vehicle based on a post-high-frequency-component-removal longitudinal acceleration obtained by removing the high-frequency component by the first longitudinal acceleration calculation unit and a post-low-frequency-component-removal longitudinal acceleration obtained by removing the low-frequency component by the second longitudinal acceleration calculation unit; and a control command calculation unit configured to output a control command for controlling the actuator based on the composed lateral acceleration obtained by the third lateral acceleration calculation unit and the composed longitudinal acceleration obtained by the third longitudinal acceleration calculation unit.

2. The vehicle control device according to claim 1, wherein a first frequency region to be removed by the first lateral acceleration calculation unit and a second frequency region to be removed by the second lateral acceleration calculation unit are determined based on the speed of the vehicle.

3. The vehicle control device according to claim 1, wherein a first frequency region to be removed by the first lateral acceleration calculation unit and a second frequency region to be removed by the second lateral acceleration calculation unit are determined such that a gain of a sum of the post-high-frequency-component-removal lateral acceleration and the post-low-frequency-component-removal lateral acceleration is 1.

4. A vehicle control system, comprising:

a force generation mechanism configured to adjust a force between a body of a vehicle and a wheel of the vehicle; and a controller, wherein the controller includes:

a first lateral acceleration calculation unit configured to estimate a first lateral acceleration of the vehicle based on a yaw rate of the vehicle detected by a yaw rate sensor and a speed of the vehicle detected by a vehicle speed sensor, and remove a high-frequency component of the first lateral acceleration;

a second lateral acceleration calculation unit configured to estimate a second lateral acceleration of the vehicle based on a steering operation amount of the vehicle, and remove a low-frequency component of the second lateral acceleration;

a third lateral acceleration calculation unit configured to obtain a composed lateral acceleration of the vehicle based on a post-high-frequency-component-removal lateral acceleration obtained by removing the high-frequency component by the first lateral acceleration calculation unit and a post-low-frequency-component-removal lateral acceleration obtained by removing the low-frequency component by the second lateral acceleration calculation unit;

a first longitudinal acceleration calculation unit configured to remove a high-frequency component of a first longitudinal acceleration of the vehicle detected by a longitudinal acceleration sensor;

a second longitudinal acceleration calculation unit configured to estimate a second longitudinal acceleration of the vehicle based on a braking or driving operation amount of the vehicle, and remove a low-frequency component of the second longitudinal acceleration;

a third longitudinal acceleration calculation unit configured to obtain a composed longitudinal acceleration of the vehicle based on a post-high-frequency-component-removal longitudinal acceleration obtained by removing the high-frequency component by the first longitudinal acceleration calculation unit and a post-low-frequency-component-removal longitudinal acceleration obtained by removing the low-frequency component by the second longitudinal acceleration calculation unit; and a control command calculation unit configured to output a control command for controlling the force generation mechanism based on the composed lateral acceleration obtained by the third lateral acceleration calculation unit and the composed longitudinal acceleration obtained by the third longitudinal acceleration calculation unit.

5. The vehicle control system according to claim 4, wherein a first frequency region to be removed by the first lateral acceleration calculation unit and a second frequency region to be removed by the second lateral acceleration calculation unit are determined based on the speed of the vehicle.

6. The vehicle control system according to claim 4, wherein a first frequency region to be removed by the first lateral acceleration calculation unit and a second frequency region to be removed by the second lateral acceleration calculation unit are determined such that a gain of a sum of the post-high-frequency-component-removal lateral acceleration and the post-low-frequency-component-removal lateral acceleration is 1.

\* \* \* \* \*